(12) United States Patent
 Li

(10) Patent No.: US 10,083,538 B2
(45) Date of Patent: *Sep. 25, 2018

(54) VARIABLE RESOLUTION VIRTUAL REALITY DISPLAY SYSTEM

(71) Applicant: Ariadne's Thread (USA), Inc., Solana Beach, CA (US)

(72) Inventor: Adam Li, Solana Beach, CA (US)

(73) Assignee: Ariadne's Thread (USA), Inc., Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/472,243

(22) Filed: Mar. 28, 2017

(65) Prior Publication Data
US 2017/0200304 A1    Jul. 13, 2017

Related U.S. Application Data

(63) Continuation of application No. 14/872,488, filed on Oct. 1, 2015, now Pat. No. 9,607,428, which is a continuation-in-part of application No. 14/788,633, filed on Jun. 30, 2015, now Pat. No. 9,240,069.

(51) Int. Cl.
 *G06T 15/10* (2011.01)
 *G06T 3/40* (2006.01)
 *G06T 19/00* (2011.01)

(52) U.S. Cl.
 CPC .............. *G06T 15/10* (2013.01); *G06T 3/40* (2013.01); *G06T 19/00* (2013.01); *G06T 2215/16* (2013.01); *G06T 2219/2016* (2013.01)

(58) Field of Classification Search
 CPC .......... G06F 3/012; G06F 3/011; G06F 3/017; G06T 19/006; G06T 7/70; G09G 2320/0261; G09G 2380/02
 See application file for complete search history.

(56) References Cited

U.S. PATENT DOCUMENTS

| 5,841,439 A | 11/1998 | Pose et al. |
| 6,445,815 B1 | 9/2002 | Sato |
| 7,469,166 B2 | 12/2008 | Dariush |

(Continued)

OTHER PUBLICATIONS

Benton, Oculus Rift in Action, Aug. 18, 2014, obtained from http://rifty-business.blogspot.com/2014/08/using-timewarp-on-oculus-rift.html on Nov. 8, 2017.*

(Continued)

*Primary Examiner* — Haixia Du
(74) *Attorney, Agent, or Firm* — Arc IP Law, PC; Joseph J. Mayo

(57) ABSTRACT

A virtual reality display system that renders images at different resolutions in different parts of a display. Reduces rendering latency by rendering at a lower resolution in selected regions, for example on the sides of a display where human vision has lower resolution than in the center. Pixels in low resolution regions are combined into grid elements, and rendering may generate grid element values rather than individual pixel values. Rendering may use ray casting, rasterization, or both. Variable resolution rendering may be combined with variable level of detail geometry models to further reduce rendering time. Selected objects may be designed as high resolution objects that are rendered at a high resolution even in low resolution display regions.

6 Claims, 25 Drawing Sheets

(56) References Cited

U.S. PATENT DOCUMENTS

| | | | |
|---|---|---|---|
| 7,860,676 | B2 | 12/2010 | Sheng et al. |
| 8,113,991 | B2 | 2/2012 | Kutliroff |
| 8,629,836 | B2 | 1/2014 | Liberty |
| 8,866,742 | B2 | 10/2014 | Banning |
| 9,063,330 | B2 | 6/2015 | LaValle et al. |
| 9,164,588 | B1 | 10/2015 | Johnson et al. |
| 9,229,540 | B2 | 1/2016 | Mandella et al. |
| 9,240,069 | B1 | 1/2016 | Li |
| 9,459,276 | B2 | 10/2016 | Joseph |
| 2007/0183649 | A1 | 8/2007 | Kiefer et al. |
| 2008/0143729 | A1 | 6/2008 | Wyatt et al. |
| 2010/0111370 | A1 | 5/2010 | Black et al. |
| 2010/0232727 | A1 | 9/2010 | Engedal |
| 2011/0018811 | A1 | 1/2011 | Miernik |
| 2011/0018903 | A1 | 1/2011 | Lapstun et al. |
| 2011/0157028 | A1 | 6/2011 | Stallings et al. |
| 2011/0302293 | A1 | 12/2011 | Buban |
| 2012/0188179 | A1 | 7/2012 | Karlsson |
| 2012/0235902 | A1 | 9/2012 | Eisenhardt et al. |
| 2012/0256840 | A1 | 10/2012 | Razzaghi |
| 2013/0018679 | A1 | 1/2013 | Qian |
| 2013/0235696 | A1 | 9/2013 | Larsen et al. |
| 2013/0238295 | A1 | 9/2013 | Hyung et al. |
| 2013/0241947 | A1 | 9/2013 | Hirota et al. |
| 2014/0049983 | A1 | 2/2014 | Nichol et al. |
| 2014/0125471 | A1 | 5/2014 | Organ et al. |
| 2014/0146394 | A1 | 5/2014 | Tout et al. |
| 2014/0201690 | A1 | 7/2014 | Holz |
| 2015/0029218 | A1 | 1/2015 | Williams et al. |
| 2015/0049004 | A1 | 2/2015 | Deering et al. |
| 2015/0097858 | A1 | 4/2015 | Miki et al. |
| 2015/0153575 | A1 | 6/2015 | Komatsu et al. |
| 2015/0219899 | A1 | 8/2015 | Mack et al. |
| 2015/0287230 | A1* | 10/2015 | Cerny .............. G06T 15/005 345/501 |
| 2015/0302653 | A1 | 10/2015 | Algreatly |
| 2015/0323988 | A1 | 11/2015 | Kuehne |
| 2016/0025971 | A1 | 1/2016 | Crow et al. |
| 2016/0070439 | A1 | 3/2016 | Bostick et al. |
| 2016/0085310 | A1 | 3/2016 | Shotton et al. |
| 2016/0210780 | A1* | 7/2016 | Paulovich ............. G06T 7/73 |
| 2017/0018121 | A1 | 1/2017 | Lawson et al. |

OTHER PUBLICATIONS

International Search Report and Written Opinion of International Application No. PCT/US16/38564, dated August 5, 2016, 9 pages.
D3, Realtime 3D Simulation, posted on https://d3technologies.com/features/3d_simulation, dated Dec. 10, 2013, 3 pages
Benton, Alex, "Oculus Rift in Action", Aug. 9, 2013, Obtained from http://rifty-business.blogspot.com/2013/08/understanding-oculus-rift-distortion.html.
Benton, Alex, "Oculus Rift in Action", Aug. 18, 2014, Obtained from http://rifty-business.blogspot.com/2014/08/using-timewarp-on-oculus-rift.html.
International Search Report received in PCT/US2017/026363, dated Jul. 10, 2017, 9 pages
International Search Report received in PCT/US2017/053929, dated Jan. 4, 2017, 10 pages.
LaValle, Steve, "The Latent Power of Prediction", blog post retrieved from www.developer.oculus.com/blog/the-latent-power-of-prediction/, dated Jul. 12, 2013.

\* cited by examiner

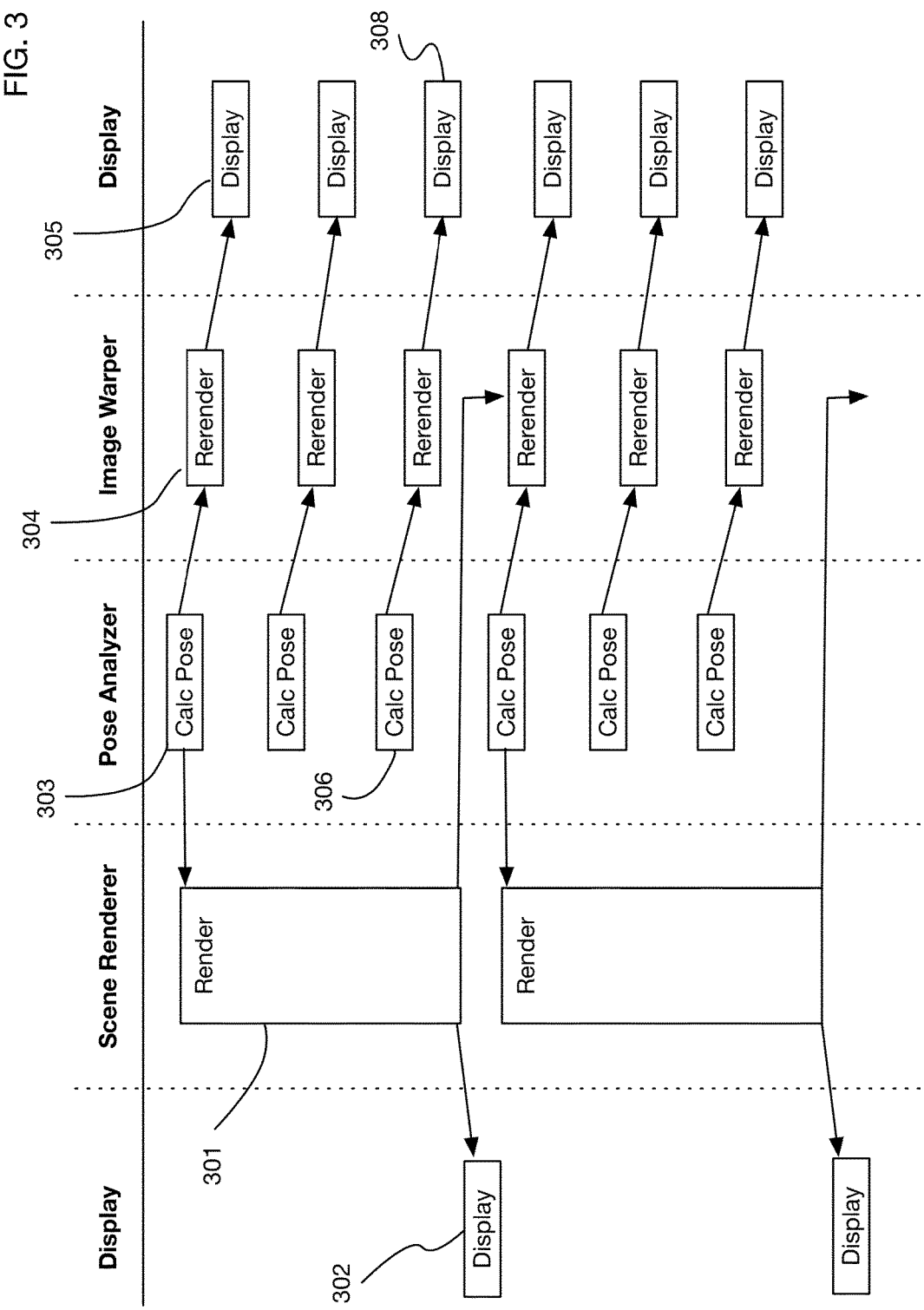

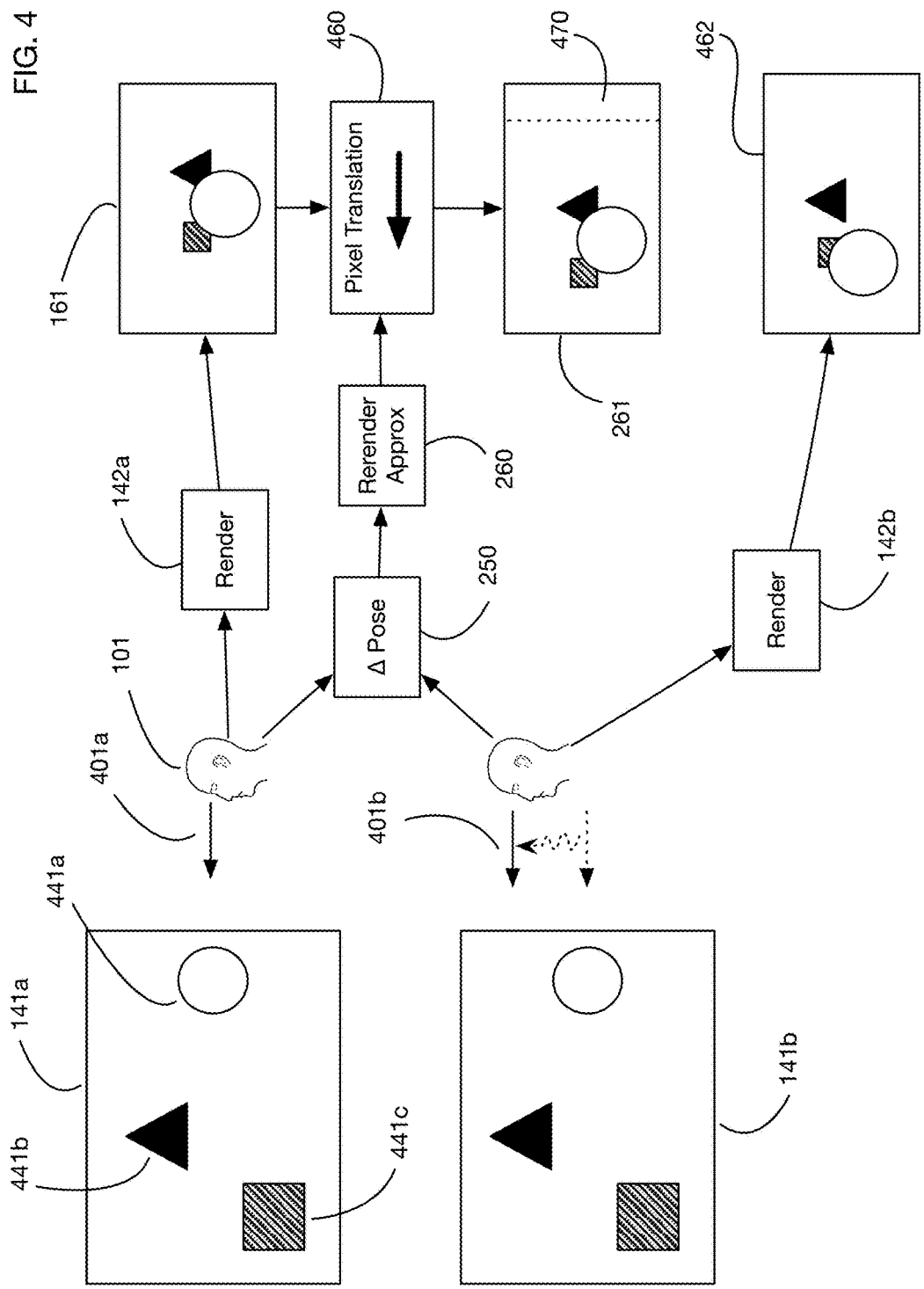

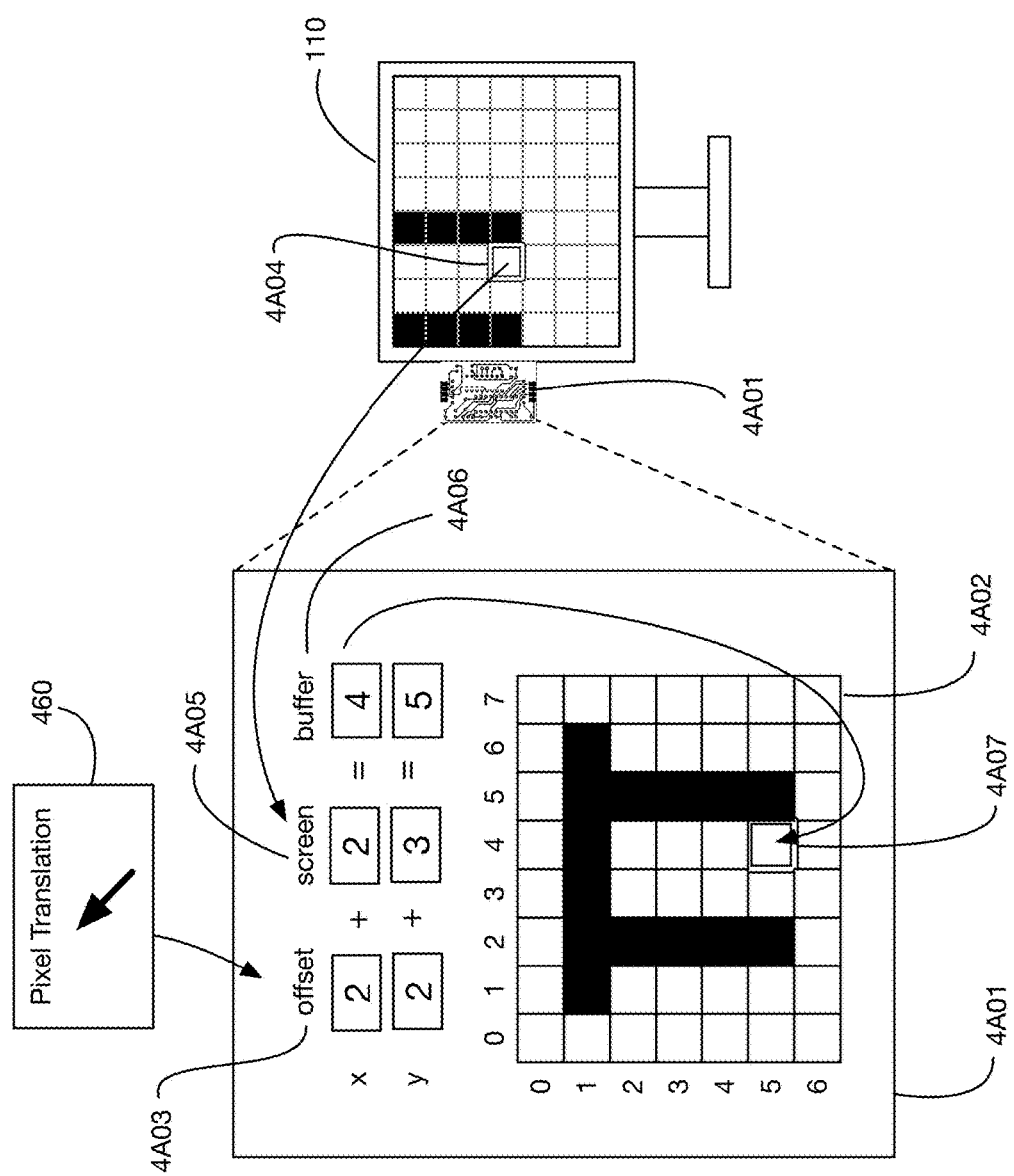

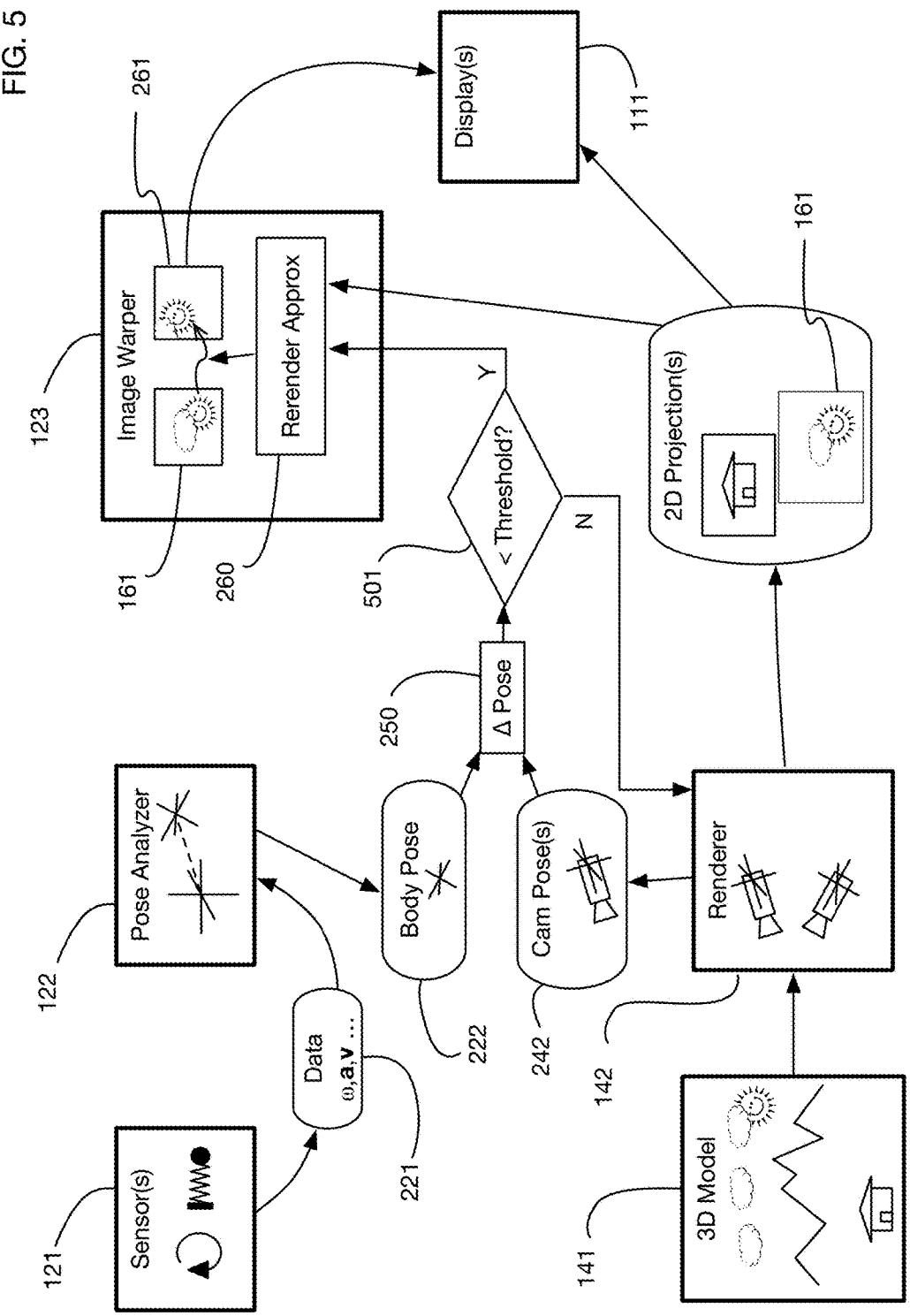

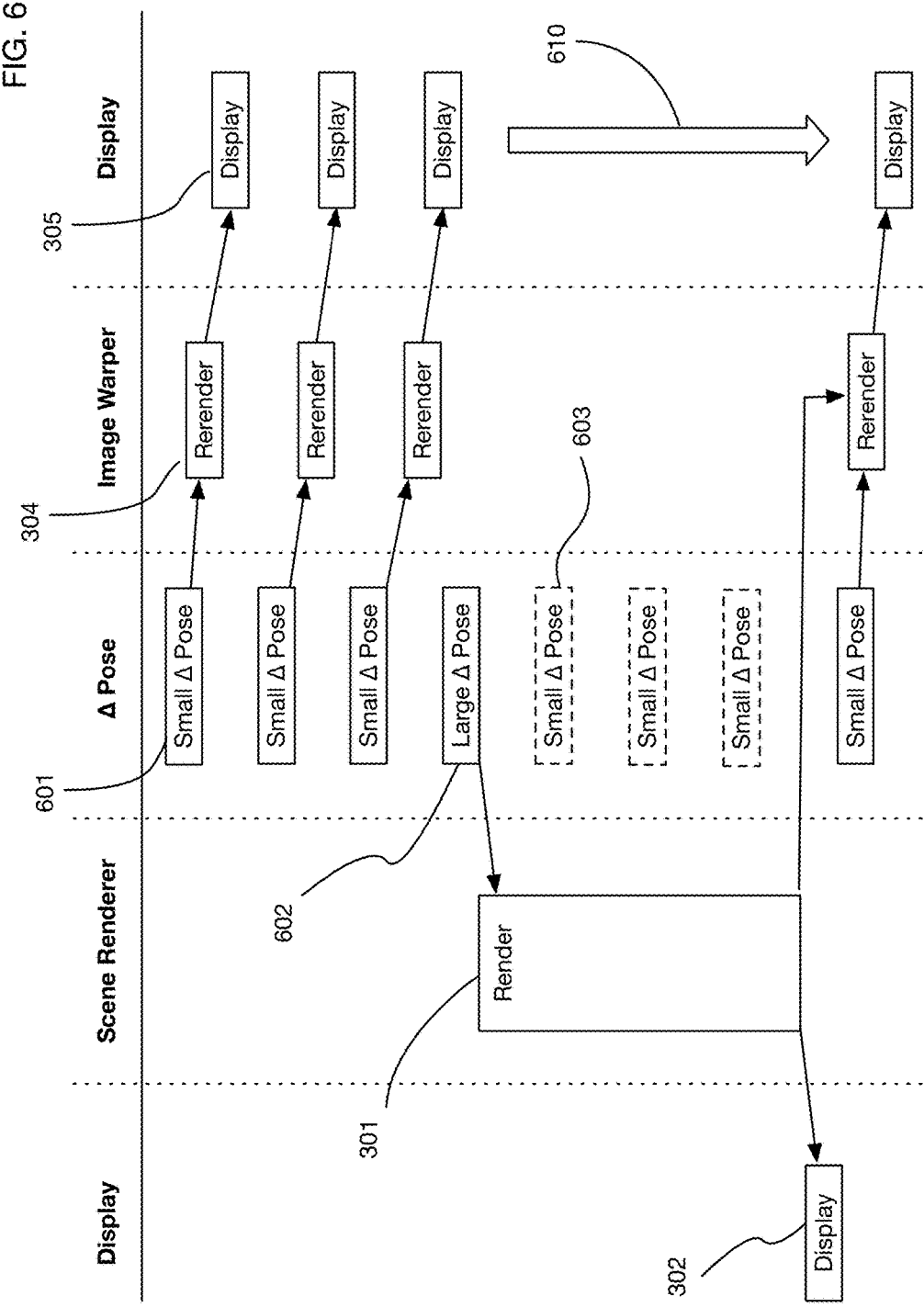

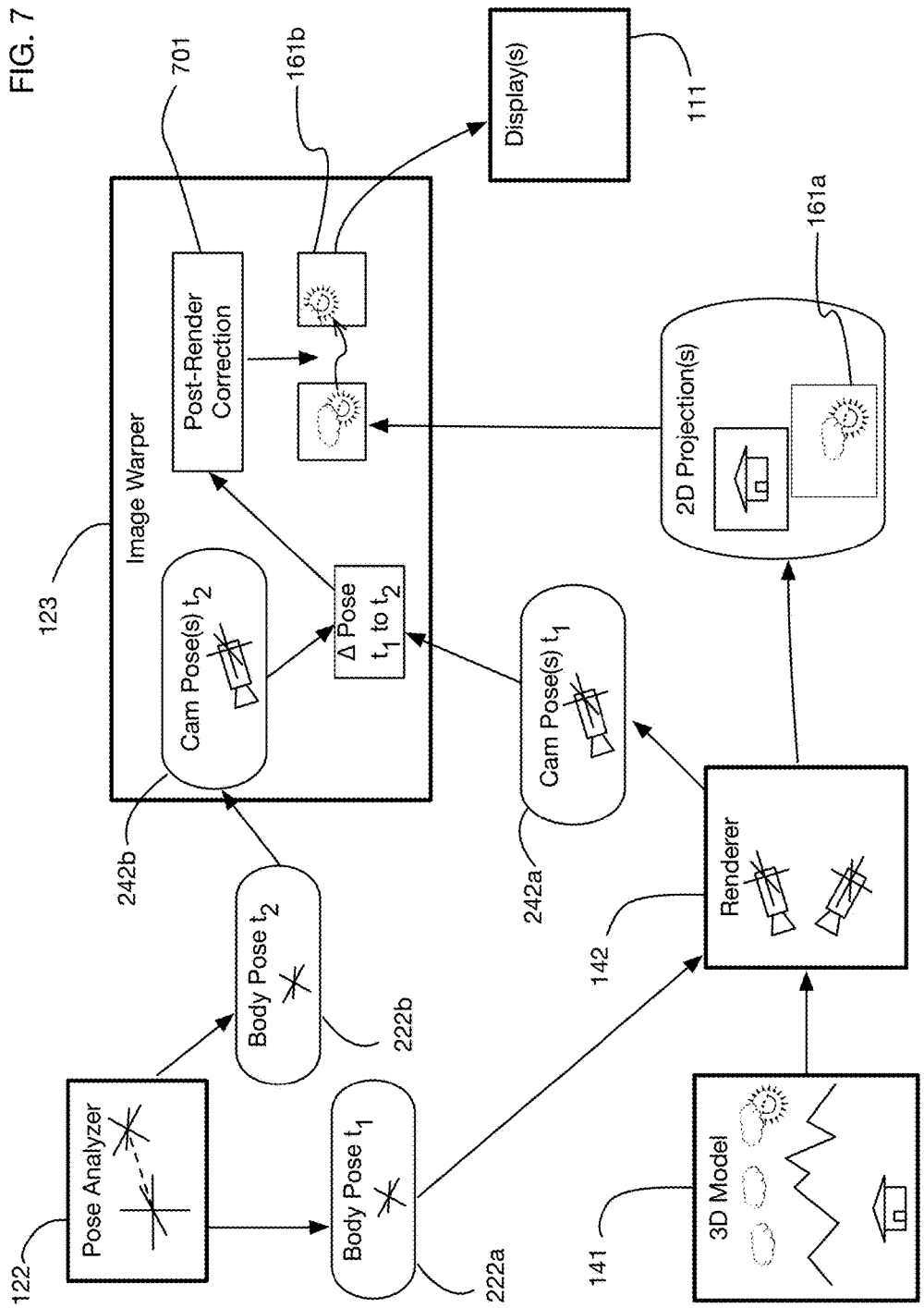

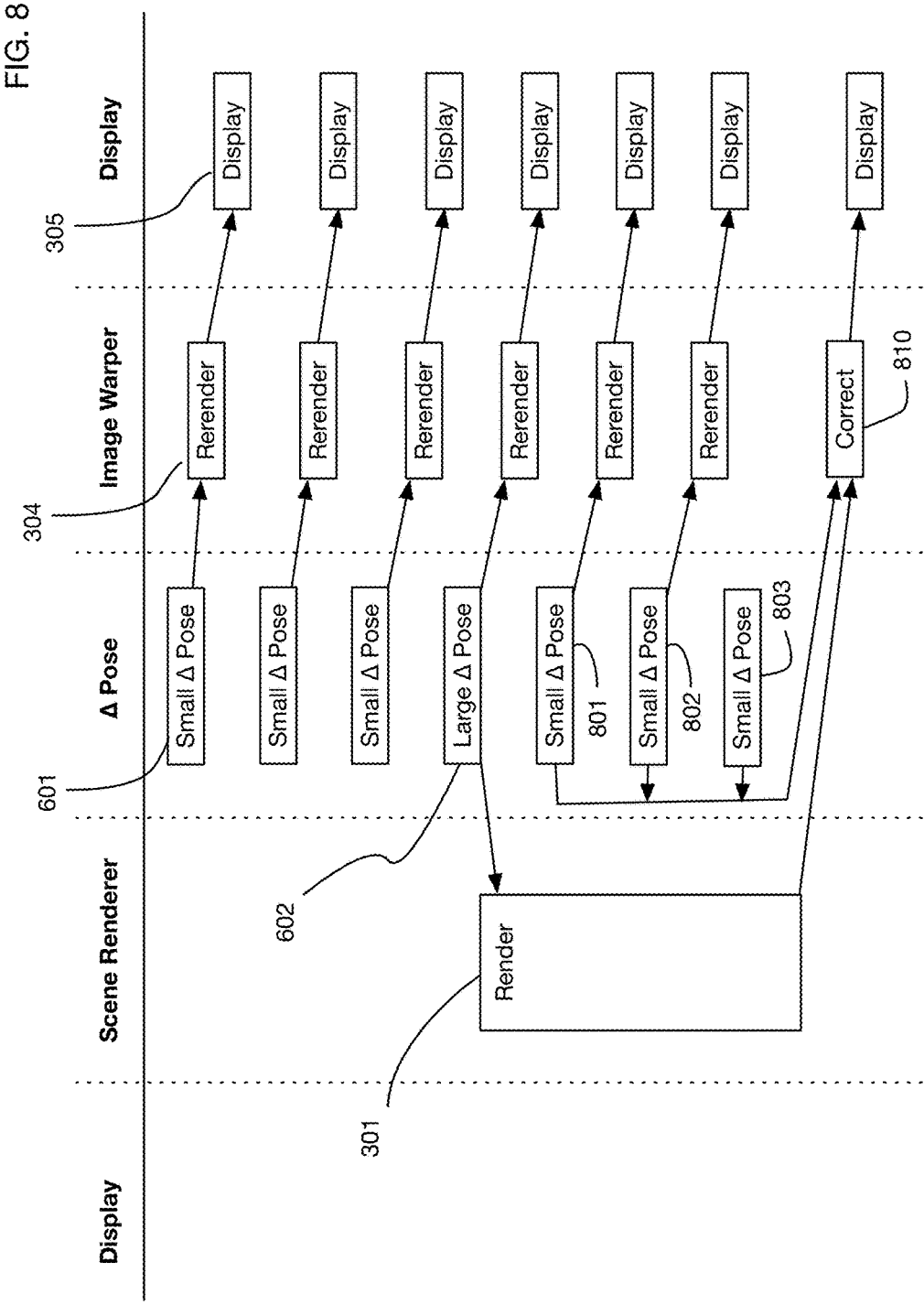

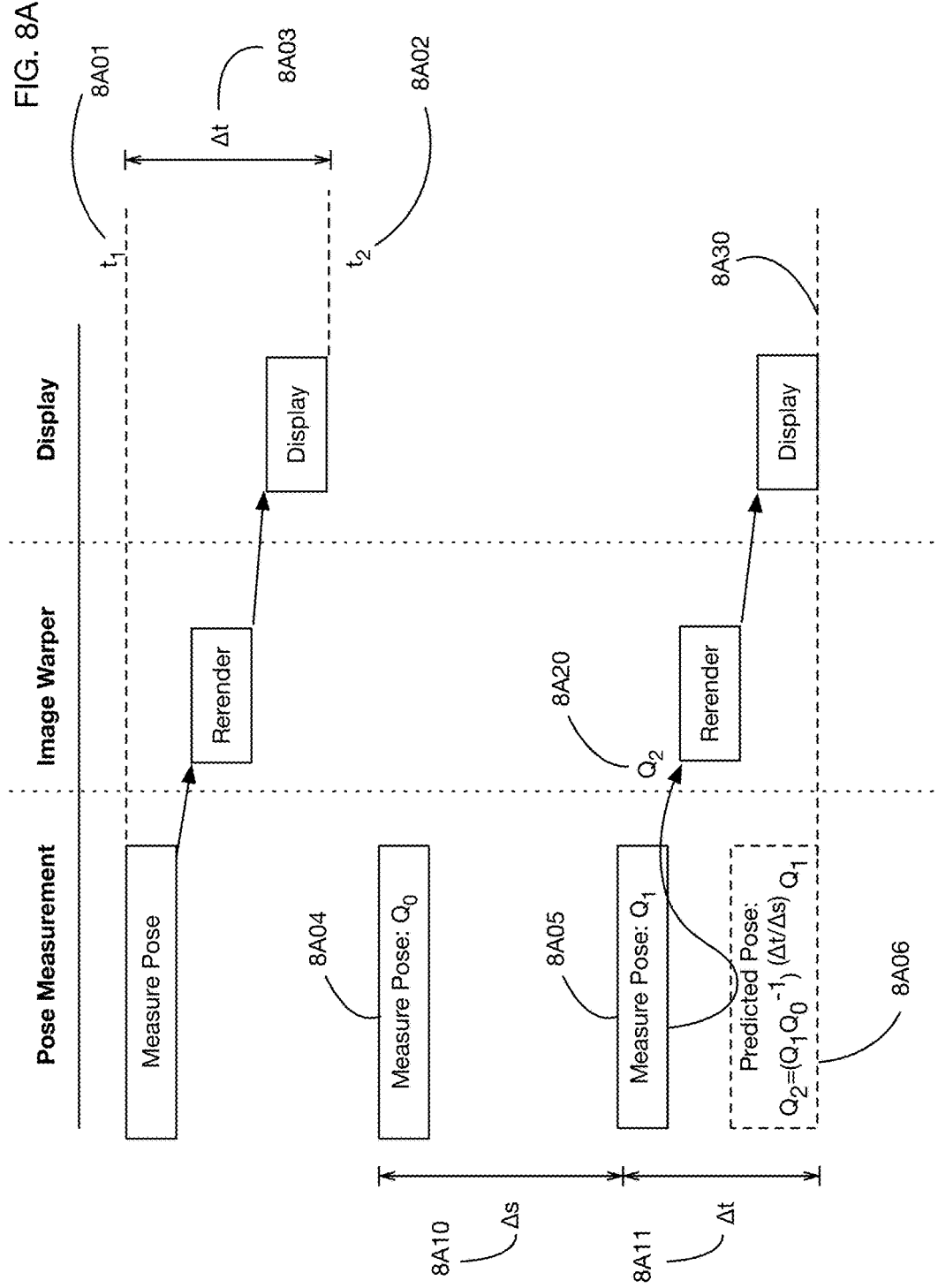

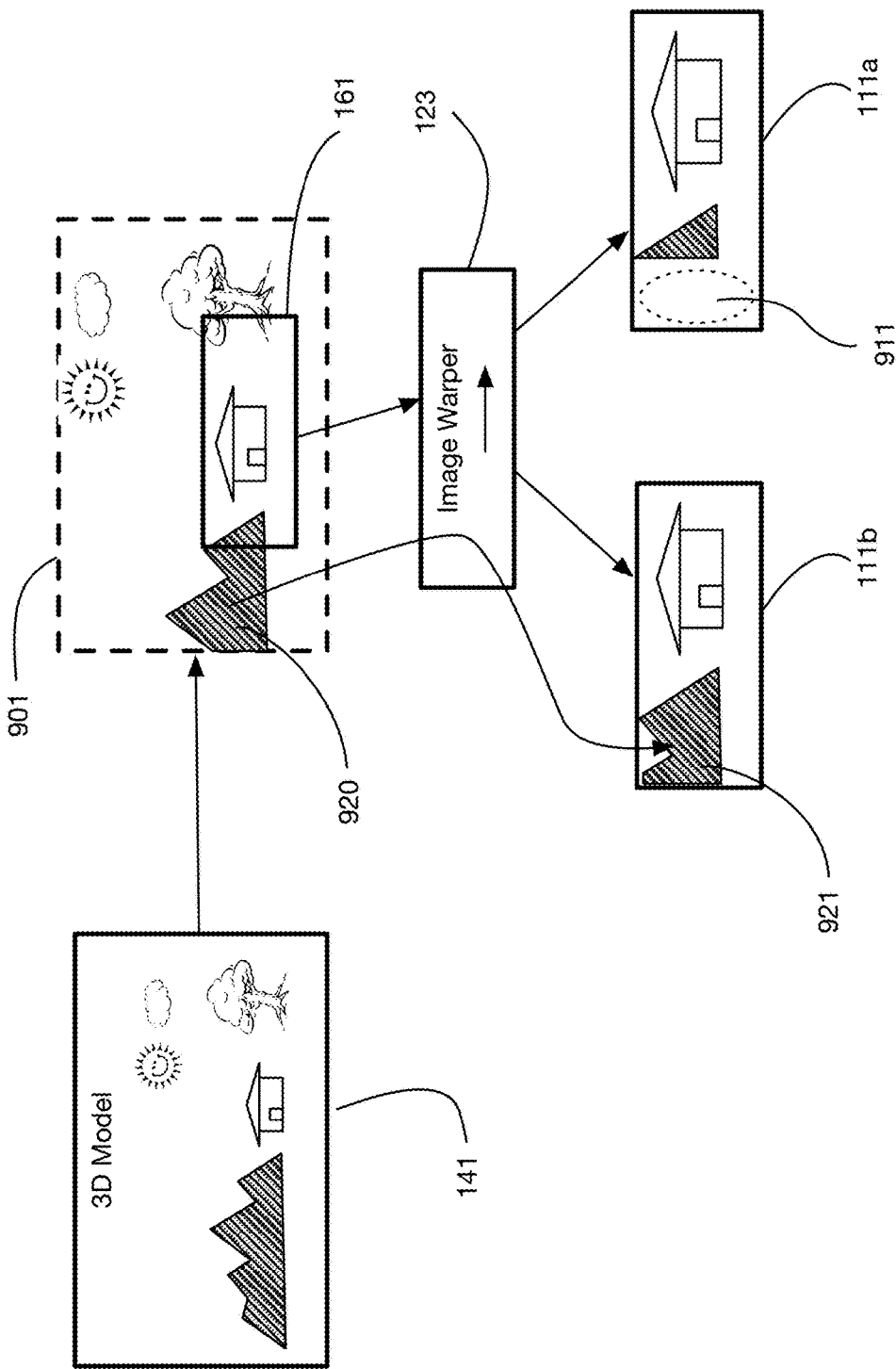

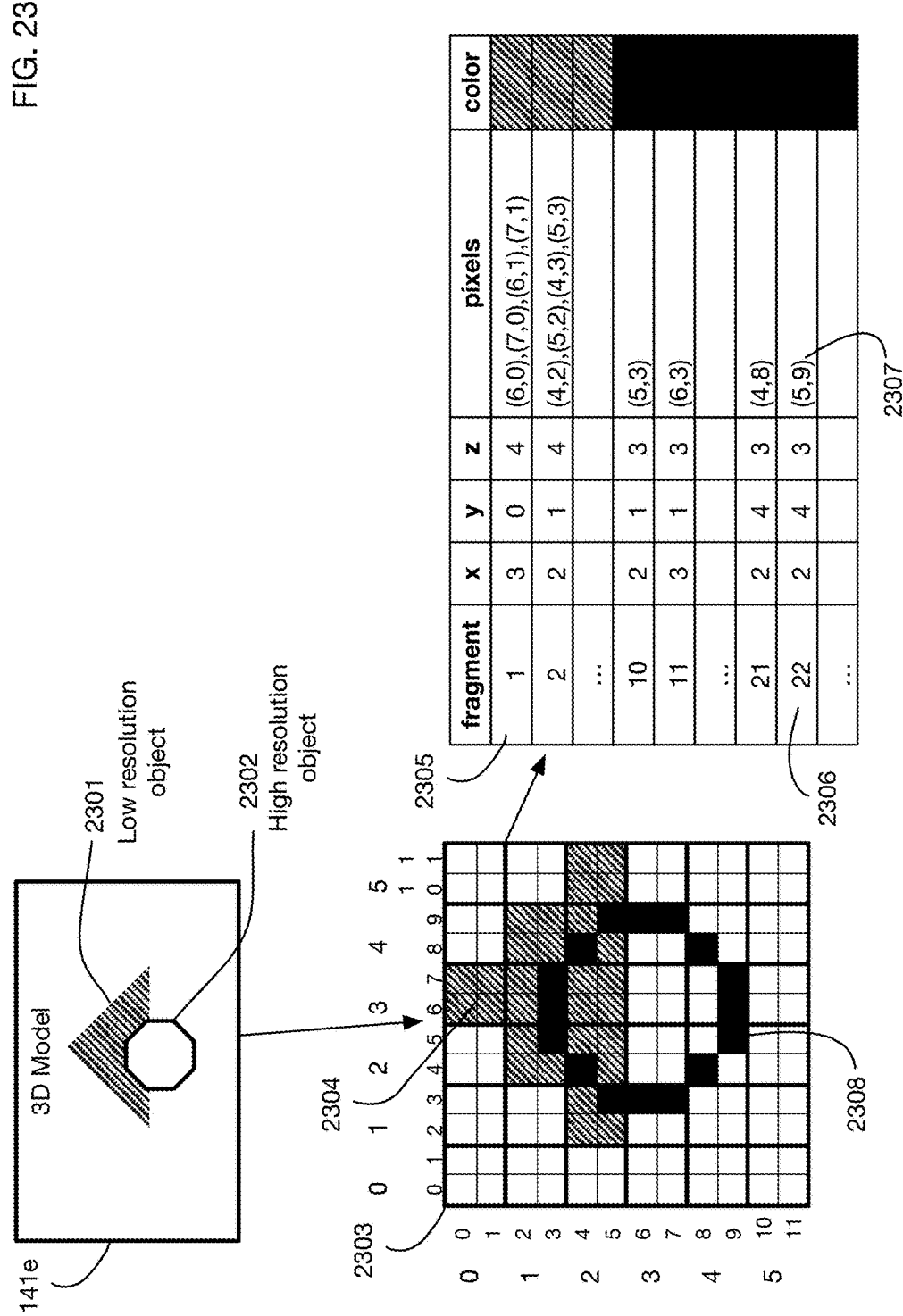

VARIABLE RESOLUTION VIRTUAL REALITY DISPLAY SYSTEM

This application is a continuation of U.S. Utility patent application Ser. No. 14/872,488 filed Oct. 1, 2015, issued as U.S. Pat. No. 9,607,428, which is a continuation in part of U.S. Utility patent application Ser. No. 14/788,633 filed Jun. 30, 2015, the specifications of which are hereby incorporated herein by reference.

BACKGROUND OF THE INVENTION

Field of the Invention

One or more embodiments of the invention are related to the field of virtual reality systems. More particularly, but not by way of limitation, one or more embodiments of the invention enable a virtual reality display system that renders different regions of a display at different resolutions as well as tracks movements of a user and quickly renders a virtual reality display based on those movements.

Description of the Related Art

Virtual reality systems are known in the art. Such systems generate a virtual world for a user that responds to the user's movements. Examples include various types of virtual reality headsets and goggles worn by a user, as well as specialized rooms with multiple displays. Virtual reality systems typically include sensors that track a user's head, eyes, or other body parts, and that modify the virtual world according to the user's movements. The virtual world consists of a three-dimensional model, computer-generated or captured from real-world scenes. Images of the three-dimensional model are generated based on the user's position and orientation. Generation of these images requires rendering of the three-dimensional model onto one or more two-dimensional displays. Rendering techniques are known in the art and are often used for example in 3D graphics systems or computer-based games, as well as in virtual reality systems.

A major challenge for existing virtual reality systems is combining realistic images with low-latency rendering, so that user's virtual reality experience matches the rapid feedback to movement observed in real environments. Existing systems often have long latency to measure changes in the user's position and orientation, and to rerender the virtual world based on these changes. 3D rendering is a complex and processor intensive operation that can take potentially hundreds of milliseconds. The result is that users perceive noticeable lag between their movements and the rendering of updated virtual environments on their displays. Three technology trends are compounding this challenge: (1) The complexity of 3D models is growing as more 3D data is captured and generated. (2) Resolution of virtual reality displays is increasing, requiring more computational power to render images. (3) Users are relying increasingly on mobile devices with limited processor capacity. As a result of these trends, high latency in rendering virtual reality displays has become a major factor limiting adoption and applications of virtual reality technology. There are no known systems that provide sufficiently low-latency rendering and display to generate highly responsive virtual reality environments given these technology constraints.

One factor contributing to rendering latency is the resolution of a virtual reality display. In general, displays with large numbers of pixels require more rendering computation and thus may experience greater latency. Displays known in the art typically consist of rectangular arrays of pixels with uniform pixel density throughout the display. However, human vision has high resolution only in the center of the field view. Therefore, rendering images at high resolution on the sides of a display may be unnecessary, and may contribute to higher latency without improving the user's experience.

For at least the limitations described above there is a need for a variable resolution virtual reality display system.

BRIEF SUMMARY OF THE INVENTION

One or more embodiments described in the specification are related to a low-latency virtual reality display system. Embodiments of the system use efficient approximations to rerender virtual reality displays quickly in response to changes in the position or orientation of a user. This efficient and rapid rerendering reduces latency and improves the user's virtual reality experience.

One or more embodiments of the system include one or more displays viewable by a user. For example, these displays may be embedded in virtual reality goggles or glasses. One or more embodiments also include one or more sensors that measure aspects of the user's position, orientation, or both. Aspects of the user's orientation and position are referred to as the user's "pose" in this specification. Pose sensors may for example measure movements of the user's head, or of the user's eyes, or more generally of any body part or parts of the user. Embodiments of the system include a pose analyzer that receives sensor data and determines the user's pose from this data. The pose information is passed to a scene renderer, which generates the 3D virtual reality display viewed by the user. This display shows a portion of a 3D scene model that is visible to the user based on the user's current pose. The 3D scene model is the model of the virtual world that the user navigates through by changing pose.

The scene renderer generates one or more 2D projections from the 3D scene model. In one or more embodiments, these projections may be generated using well known 3D graphics techniques, for example using virtual cameras and perspective projection transformations onto the view planes of the virtual cameras. The 2D projections are then transmitted to the displays.

In addition, one or more embodiments of the system include an image warper. The image warper is the system component that provides for low-latency virtual reality display via efficient rerendering of scenes. The image warper may for example monitor the pose changes of the user and rerender displayed images based on these pose changes. The rerendering performed by the image warper may be a rerendering approximation, rather than a full perspective projection from the original 3D scene model. For example, some embodiments perform rerendering approximations by warping display images in relatively simple ways to partially reflect the changes in the user's pose. These rerendering approximations may offer lower latency display updates, although in some embodiments they may not be fully realistic compared to the full rendering process.

One or more embodiments of the system perform approximate rerendering by calculating a pixel translation vector, and then translating pixels of the display by this pixel translation vector. Effectively the image warper in these embodiments may shift pixels in a calculated direction and by a calculated amount to approximate the effect of the user's movements on the display. This approximation is not full 3D rendering, but it can be performed very quickly in some embodiments, greatly reducing latency between user's movements and display updates.

One or more embodiments of the system may use hardware acceleration to modify the pixels of a display to perform approximate rerendering. For example, display hardware or graphics processing unit hardware may support commands to directly shift pixels based on a pixel translation vector. Implementing pixel translations or other approximate rerendering transformations in hardware may further reduce latency in one or more embodiments.

In one or more embodiments, the rerendering approximations performed by the image warper may only be performed if the pose changes of a user are below a particular threshold value. For large changes in pose, the approximations used by the image warper may become inadequate, and it may be preferable to perform a full 3D rendering despite the high latency. For small changes in pose, the rerendering approximations may be sufficiently realistic.

In one or more embodiments, multiple pose changes for a user may be received while a full 3D rendering process is executed. By the time the 3D rendering process has completed, the initial user pose that was used for the rendering may be out of date, since newer pose data is by then available. One or more embodiments may perform a post-rendering correction on the rendered images, using the image warper to apply updates to the rendered images prior to displaying them. These post-rendering corrections may improve synchronization between the displayed images and the user's current pose.

One or more embodiments of the system may use pose prediction to calculate or estimate the pose of a user at a future time when the rendering and display processes are complete. Pose prediction may reduce the apparent latency between changes in user pose and corresponding display updates. One or more embodiments may use pose prediction for full rendering, for image warping, or for both. Embodiments may use any desired technique for pose prediction, including for example simple extrapolation of pose changes. With pose prediction, the predicted pose is provided to the rendering or approximate rerendering processes, rather than the measured pose. The rendering process calculates virtual camera poses from the predicted pose values, and renders a scene based on these virtual camera poses. The image warper calculates pose changes using the difference between the predicted future pose and the previously calculated virtual camera pose from full rendering of the scene.

One challenge faced by some embodiments is that the image warping process may leave holes in the display images with missing pixels. For example, if all pixels are shifted to the right, then the left edge of the display will have a hole without pixel data. Embodiments may employ various approaches to handle these holes. In one or more embodiments, the 3D renderer may render 2D projections that are larger than the display area. Pixels outside the display area may be cached in these embodiments in an off-screen cache, and retrieved when performing image warping to fill holes.

Another approach to filling holes employed by one or more embodiments is to estimate pixel values for the holes based on the pixel values of nearby pixels. For example, in one or more embodiments pixel values from the boundaries of regions may be propagated into the holes to fill them. Simple propagation of boundary pixels into holes may in some cases result in visual artifacts. In one or more embodiments, blur transformations may be applied to pixels in the holes or near the holes to reduce these artifacts.

One or more embodiments may employ various types of rerendering approximations for image warping. One technique used by some embodiments is to generate a simplified 3D model from the 2D projections received from the scene rendered, and to reproject these simplified 3D models onto the updated view planes that correspond to changes in the user's pose. For example, one or more embodiments may create a simplified 3D model by mapping a 2D projection from rendering onto another plane in the simplified 3D model, where the distance of this plane from the user reflects an average or typical depth of the objects in the complete 3D scene model. The depth of such an average plane may be fixed, or it may be supplied by the scene renderer with each 2D projection. One or more embodiments may use other simplified 3D models, such as spherical or cylindrical surfaces for example.

For small changes in pose, rerendering approximations based on reprojecting from a simplified 3D planar model may be approximately equivalent to using a pixel translation vector to shift pixels in display images in response to pose changes. For example, one or more embodiments may calculate a pixel translation vector for a rotation of a user around axis $\hat{\omega}$ by a small angle $\Delta\theta$ as $(\hat{\omega}_y\Delta\theta, -\hat{\omega}_x\Delta\theta)$, which is then scaled to the reflect the pixel dimensions of the display. This formula reflects that small angular rotations of a user's view approximately result in pixels shifting in response to the rotations, with the amount of shift proportional to the angle of rotation. Changes in user pose may also involve translations (linear motions of the user). For translations, the amount of shifting of pixels is also a function of the distance of objects from a user: the closer the object to the user, the more pixels shift in response to user translations. In one or more embodiments, a rerendering approximation may be estimated by a pixel translation vector using an average depth estimate $z^*$ for the distance between the user and the objects in the 2D projection. These embodiments may calculate a pixel translation vector for a user translation by small vector $\Delta r$ as $(-\Delta r_x/z^*, -\Delta r_y/z^*)$, which is then scaled to reflect the pixel dimensions of the display. This formula reflects that objects that are further away shift less than objects that are closer. It also reflects that pixels shift in the direction opposite to the movement of the user. One or more embodiments may user pixel translation vectors for rerendering approximations that combine the above effects of user rotation and user translation, such as for example $(\hat{\omega}_y\Delta\theta - \Delta r_x/z^*, -\hat{\omega}_x\Delta\theta - \Delta r_y/z^*)$.

In summary, one or more embodiments of the invention enable a low-latency virtual reality display by using techniques to efficiently and approximately rerender images based on changes in the user's pose. Such techniques include, but are not limited to, shifting pixels by a pixel translation vector that is calculated from the user's movements. One or more embodiments may provide additional features such as filling of holes generated by image warping, and applying corrections prior to displaying rendered images to synchronize them with the user's current pose.

A major factor driving rendering time and latency is the number of pixels in a virtual reality display. Generally displays with more pixels require more rendering computation. Rendering latency may be reduced by using a low resolution display, but this approach may compromise the user experience. One or more embodiments of the invention may instead reduce rendering computation by rendering at lower resolution in selected portions of a display. The display hardware may have a high resolution, but not all regions of the display may be rendered at this resolution. Human vision has high resolution in the center of the field of view, but lower resolution on the sides of the field of view. One or more embodiments therefore may render a virtual environment at high resolution in the center of a display, and at lower resolution on the sides of the display. This approach may reduce latency without significantly compromising the user experience since the human mind may perceive items in an area where the focus is at a different resolution than other areas. In one or more embodiments, the center of the screen for each eye may be higher resolution that the outer edges of the screen (or screens). In other embodiments, or if programmatically altered via a user input, the center of the area that the eye is pointed at may be displayed at higher resolution, for example in embodiments that employ an eye tracker.

One or more embodiments incorporate a variable resolution virtual reality display system. The system may have one or more displays. The pixels of a display may be partitioned into regions, and rendering resolution may differ across regions. Each region may be portioned into a grid of grid elements, where each grid element contains one or more pixels. The ratio of pixels per grid element may vary across regions. For example, a high resolution center display region may have a ratio of 1 pixel per grid element, while relatively low resolution side display regions to the left and right of the center region may have a ratio of 4 or more pixels per grid element. These ratios are illustrative; one or more embodiments may have grids with any desired ratio of pixels per grid element. One or more embodiments may divide a display into any number and arrangement of display regions, with any desired pixel counts in the grid elements of each region.

One or more embodiments incorporate a 3D model of a scene, such as for example a virtual environment, and render this model onto the display or displays. The scene renderer that performs the rendering may project the 3D model onto the grid of each display region, and calculate a grid element value for each grid element from this projection. It may then assign pixel values for each pixel in the grid element based on the grid element value. Grid element values and pixel values may comprise for example, without limitation, any combination of color, intensity, hue, saturation, value, luminance, chrominance, lighting, material, texture, normal vector direction, transparency, size, shape, or pattern. Assigning pixel values based on grid element values may in one or more embodiments be a direct copying of the grid element value to the pixel values of each pixel within the grid element. One or more embodiments may perform any desired transformations to map grid element values into pixel values.

One or more embodiments may further optimize rendering using multiple geometry models at different levels of detail for one or more objects. For example, a scene renderer may select a level of detail for an object based entirely or in part on the resolution of the display region in which the object is rendered. A low level of detail model may be used for a low resolution display region, with for example multiple pixels per grid element; a high level of detail model may be used for a high resolution display region, such as for example a center region with one pixel per grid element.

One or more embodiments may use any rendering techniques known in the art. For example, one or more embodiments may use ray casting to render objects from a 3D model to a grid associated with a display region. Ray casting for a grid may for example project rays through a grid element towards objects in a 3D model, instead of through individual pixels as is typical in the art. Because low resolution display regions may have relatively small numbers of grid elements compared to pixels, efficiency of ray casting may be improved relative to a per-pixel ray casting approach.

One or more embodiments may use rasterization rendering techniques. For example, one or more embodiments may project geometric primitives from a 3D model onto an image plane associated with a display region, and then rasterize these projected primitives onto the grid for the display region. Rasterization may generate grid element fragments, which are then blended to form a final rasterized image on the display. Because the number of grid elements may be smaller than the number of pixels, rasterization to the grid may be more efficient that typical pixel-based rasterization.

Grid element fragments may comprise any information associated with a grid element, such as for example color, intensity, hue, saturation, value, depth, texture, normal direction, lighting, or material. In one or more embodiments a grid element fragment may also include a list of pixels associated with the fragment. In some cases rasterization may generate grid element fragments associated with all pixels contained within the grid element. However, one or more embodiments may rasterize projected primitives to a sub-grid-element level.

In one or more embodiments a 3D model may designate selected objects as high resolution objects, which for example may be rendered at a high resolution even in a low resolution display region. Other objects may be designated as low resolution objects. Rasterization of a high resolution object may for example generate grid element fragments with a single pixel per fragment, instead of fragments that comprise all pixels within a grid element. Low resolution objects may be rasterized to grid element fragments that contain all pixels within the grid element. One or more embodiments may select the resolution for rasterization of an object (such as single pixel or a complete grid element, for example) based on multiple factors instead of or in addition to the resolution of the display region in which the object is rasterized.

BRIEF DESCRIPTION OF THE DRAWINGS

The above and other aspects, features and advantages of the invention will be more apparent from the following more particular description thereof, presented in conjunction with the following drawings wherein:

FIG. 3 shows a swimlane diagram for the major rendering activities of the embodiment shown in FIG. 2.

FIG. 4 illustrates an embodiment of the system that implements low-latency rerendering using a pixel translation.

FIG. 4A illustrates an embodiment of the system that uses hardware accelerated rerendering using offset registers for reading frame buffer memory.

FIG. 5 illustrates an embodiment of the system that executes low-latency rerendering if the changes in a user's pose are below a threshold value.

FIG. 6 shows a swimlane diagram for the major rendering activities of the embodiment shown in FIG. 5.

FIG. 7 illustrates an embodiment of the system that performs a post-rendering modification to rendered scenes using a low-latency correction for recent changes in the user's pose.

FIG. 8 shows a swimlane diagram for the major rendering activities of the embodiment shown in FIG. 7.

FIG. 8A shows a swimlane diagram for an embodiment of the system that use pose prediction to reduce apparent latency between pose changes and display updates.

FIG. 9 illustrates an embodiment of the system that renders a scene larger than the display into an offscreen buffer, in order to fill holes generated by low-latency rerendering transformations.

FIG. 23 illustrates an embodiment that identifies selected objects as high resolution objects, and that renders these high resolution objects to individual pixels even in low resolution display regions.

DETAILED DESCRIPTION OF THE INVENTION

A low-latency virtual reality display system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
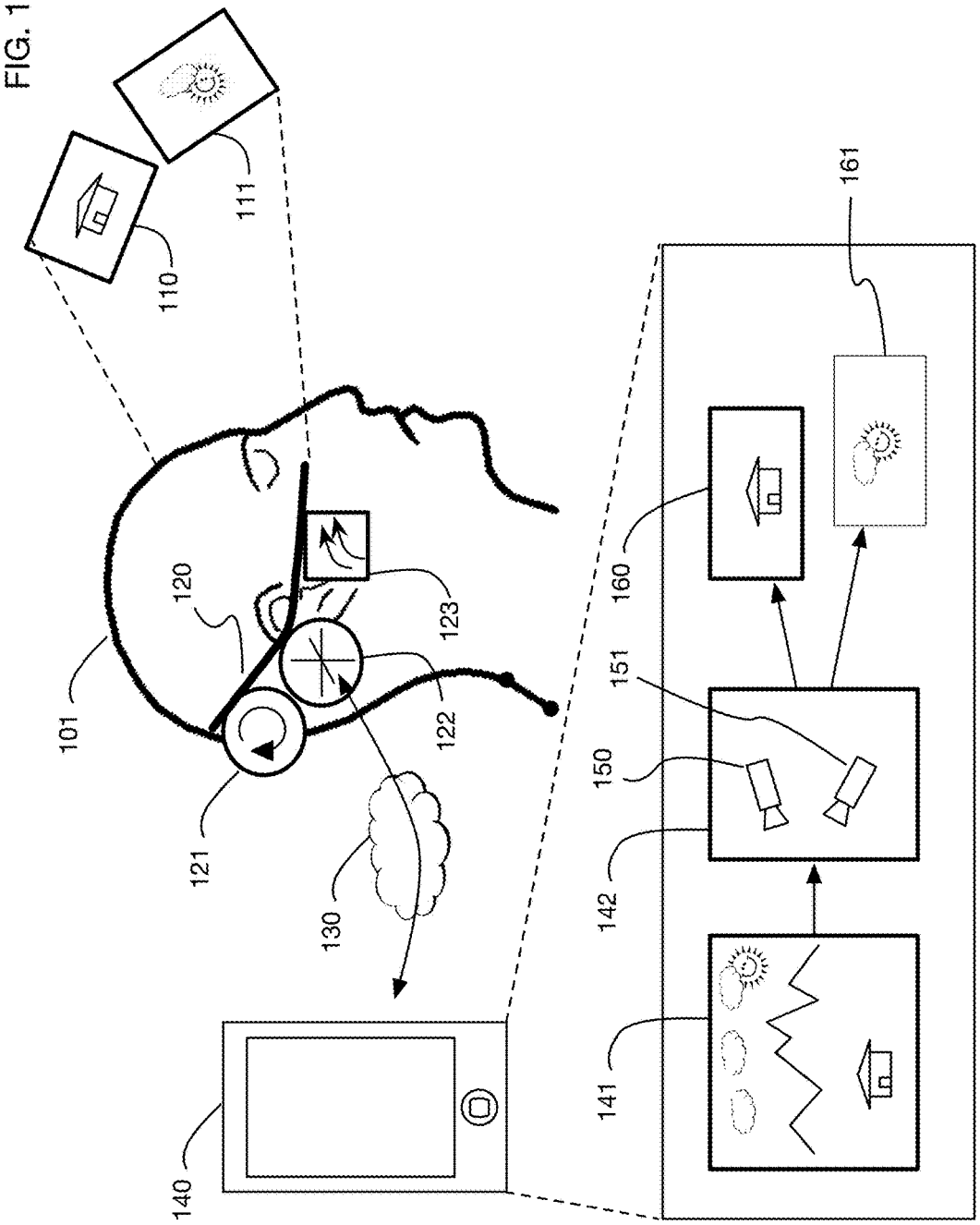
FIG. 1 illustrates the key components of at least one embodiment of low-latency virtual reality display system, configured for illustration with displays, sensors, and some processing modules embedded in virtual reality goggles, and rendering performed by a wirelessly connected mobile device.

FIG. 1 shows a high-level schematic diagram of an embodiment of the invention that embeds elements of the system into virtual reality goggles. Other embodiments may embed elements of the system into any other devices wearable by or viewable by one or more users. For example, without limitation, one or more embodiments may embed elements of the system into goggles, glasses, sunglasses, monocles, helmets, visors, binoculars, contact lenses, or ocular implants. Some embodiments may not be worn by users, but may be placed on walls, in televisions, in mirrors, on ceilings or floors, inside flight simulators or other simulators, in windshields, in windows, or in or on any other location where a virtual reality experience is desired.

In FIG. 1, user 101 wears a head-mounted device 120 that incorporates several elements of the embodiment shown. Displays 110 and 111 are in front of the user's left and right eyes, respectively. These displays are shown offset from user 101 for exposition; in reality many embodiments may position displays of head-mounted devices directly in front of the user's eyes. While the embodiment shown has two displays—one for each eye—embodiments may use any number of displays, including for example only a single display, or two displays as shown in FIG. 1, or more than two displays. In FIG. 1, the images shown on displays 110 and 111 are different; this may be useful in one or more embodiment for example to provide a stereoscopic 3D display. One or more embodiments may use the same image for multiple displays.

Device 120 includes a sensor (or multiple sensors 121). Sensor 121 measures some aspect of the position or orientation of user 101, or of changes thereto. The position and orientation of an object in three-dimensional space is referred to in the art as the "pose" of that object. Hence sensor 121 is a type of pose sensor. One or more embodiments may measure any desired aspects of the pose of any body parts of user 101. For example, in some embodiments sensor 121 may measure the pose of the user's head. In some embodiments sensor 121 may measure the pose of one or more of the user's eyes. Combinations of pose measurements for different body parts may also be used in one or more embodiments. Examples of sensors that may be used in one or more embodiments include, without limitation, accelerometers, gyroscopes, GPS trackers, ultrasonic rangefinders, pressure sensors, video cameras, altimeters, radars, sonars, magnetometers, flow meters, Doppler shift meters, or tilt sensors. Embodiments of the system may use only a single sensor, or multiple sensors. Some embodiments may use one or more sensors that directly measure some aspect of the pose of a body part of the user; for example, a magnetometer may provide partial orientation information directly. Some embodiments may use one or more sensors that indirectly measure pose; for example, a gyroscope may measure angular velocity, which must be integrated to yield orientation. The schematic of FIG. 1 shows sensor 121 located near the back of the head of user 101; this location is arbitrary and may vary in different embodiments of the invention. For example, an embodiment that uses a video camera eye tracker to measure the orientation of a user's eye may be mounted near the user's eyes. One or more embodiments may use multiple sensors at different locations of a user's body. One or more embodiments may use sensors that are not mounted on the user's body at all, but that measure some aspect of the pose of a user or one or more of the user's body parts. For example, one or more embodiments may use video cameras located near the user, and may analyze images from these cameras to determine the user's pose.

In FIG. 1, device 120 also includes pose analyzer 122. This element receives sensor data from the sensor or sensors 121, and uses this data to calculate the pose of one or more body parts of user 101. The calculations made by pose analyzer 122 will in general depend on the type of sensor or sensors 121. For example, one or more embodiments may use inertial sensors for the sensors 121, in which case the pose analyzer 122 may execute an inertial tracking algorithm to estimate the position and orientation of the user. Such inertial tracking algorithms are well known in the art. Embodiments may use any methodology to translate the raw sensor data into pose information. One or more embodiments may use more than one pose analyzer; for example, an embodiment with eye tracking sensors may use a separate pose analyzer for each eye. While FIG. 1 illustrates an embodiment with pose analyzer 122 mounted on device 120 that is attached to the user, embodiments may use pose analyzers that are not attached to the user, or may use a combination of pose analyzers on a user-mounted device and pose analyzers remote from the user.

In general a virtual reality device generates virtual reality display images based on the user's pose. For example, as a user moves or turns, different images are displayed to simulate the real experience of viewing different parts of a scene. This functionality requires a 3D model of one or more scenes, and a rendering system that renders views of the scene based on the user's pose. In the embodiment shown in FIG. 1, the 3D scene model 141 and the scene renderer 142 are located in mobile device 140. This mobile device 140 communicates with the head-mounted device 120 over a wireless network 130. This separation of functionality between a head-mounted device and a remote device is only illustrative; embodiments may use any desired architecture to organize elements of the system into devices. For example, in one or more embodiments, all elements of the system may be incorporated into a device such as head-mounted device 120 that is worn by a user. In one or more embodiments, all of the elements of the system may be remote from the user: for example, the user's orientation may be detected by video cameras in a room, the pose analyzer and scene renderer may execute on computers in the room, and the rendered images may be displayed on monitors mounted on the walls of the room. In one or more embodiments, the system may be a distributed system with elements distributed over multiple nodes that communicate over a network; for example a 3D scene model may be hosted on a remote server, rendering may be done on a device that is local to the user but not attached to the user, and the sensors and displays may be on a user-mounted device. Embodiments may use any type of network communication between elements of the system, including wired or wireless networks, or combinations thereof. Any network media and network protocols may be used to communicate between elements of the system.

3D scene model 141 contains a 3D representation of the objects that may be displayed to the user; it is a model of the 3D "virtual world." This scene model may be static, or it may change over time. Dynamic 3D scene models may also change in response to user actions or to changes in user pose. The 3D scene model may include computer-generated elements, real scene data captured by cameras or 3D scanners, or combinations of computer-generated and real data. Embodiments may use any desired type of 3D scene model, and any desired data representation for the scene model such as for example, without limitation, VRML, X3D, OBJ, COLLADA, Blender, 3DS, or any other proprietary or open format for 3D information.

Scene renderer 142 generates one or more rendered 2D images from scene model 141. In one or more embodiments of the system, the scene render generates one or more "virtual cameras" based on the pose data received from pose analyzer 122. These virtual cameras have a location and orientation in the 3D space defined by the 3D scene model. In the embodiment shown in FIG. 1, scene renderer 142 generates two virtual cameras 150 and 151, each of which corresponds to one of the two displays 110 and 111. Embodiments may use any number of virtual cameras and associate these virtual cameras in any desired manner with displays. Rendering generates a 2D projection for each of the virtual cameras. Techniques for rendering 2D projections from 3D scenes are well known in the art, and these techniques are implemented in many readily available software libraries and graphics processing units. Embodiments may use any of the well known techniques, software packages, or devices for 3D rendering to generate 2D projections. In the embodiment illustrated in FIG. 1, virtual camera 150 generates 2D projection 160, and virtual camera 151 generates 2D projection 161. 2D projections 160 and 161 are transmitted back to device 120 over network 130. These projections may be displayed directly on displays 110 and 111.

In the embodiment shown in FIG. 1, device 120 includes image warper 123. The image warper provides a low-latency "rerendering" of the projections 160 and 161 for certain types of changes in the user's pose. Specifically, the image warper receives data on the virtual camera poses 150 and 151 that were used to generate projections 160 and 161. It also receives updates to the user's pose from pose analyzer 122. By comparing the user's new pose to the virtual camera poses used to render the 2D projections, the image warper calculates a change in pose. When a user's pose changes, the full rendering path to generate new 2D projections would require another iteration of the original rendering path: pose data would be sent to device 140, and converted to virtual camera poses 150 and 151; then scene renderer 142 would generate new 2D projections from 3D scene model 141, and transmit these new 2D projections back to device 120. This full rendering path may be relatively slow, leading to observable latency for the user. The function of the image warper is to reduce this latency by performing a rapid "rerendering approximation" that provides a relatively quick and efficient update to the images 110 and 111 based on changes to the pose. This rerendering approximation is not a complete rendering as would be performed by the scene renderer 142; instead it uses approximations to reduce the calculations and communications required to update the display, thereby reducing latency. Illustrative details of how various embodiments may perform image warping are provided below.

Figure 2:
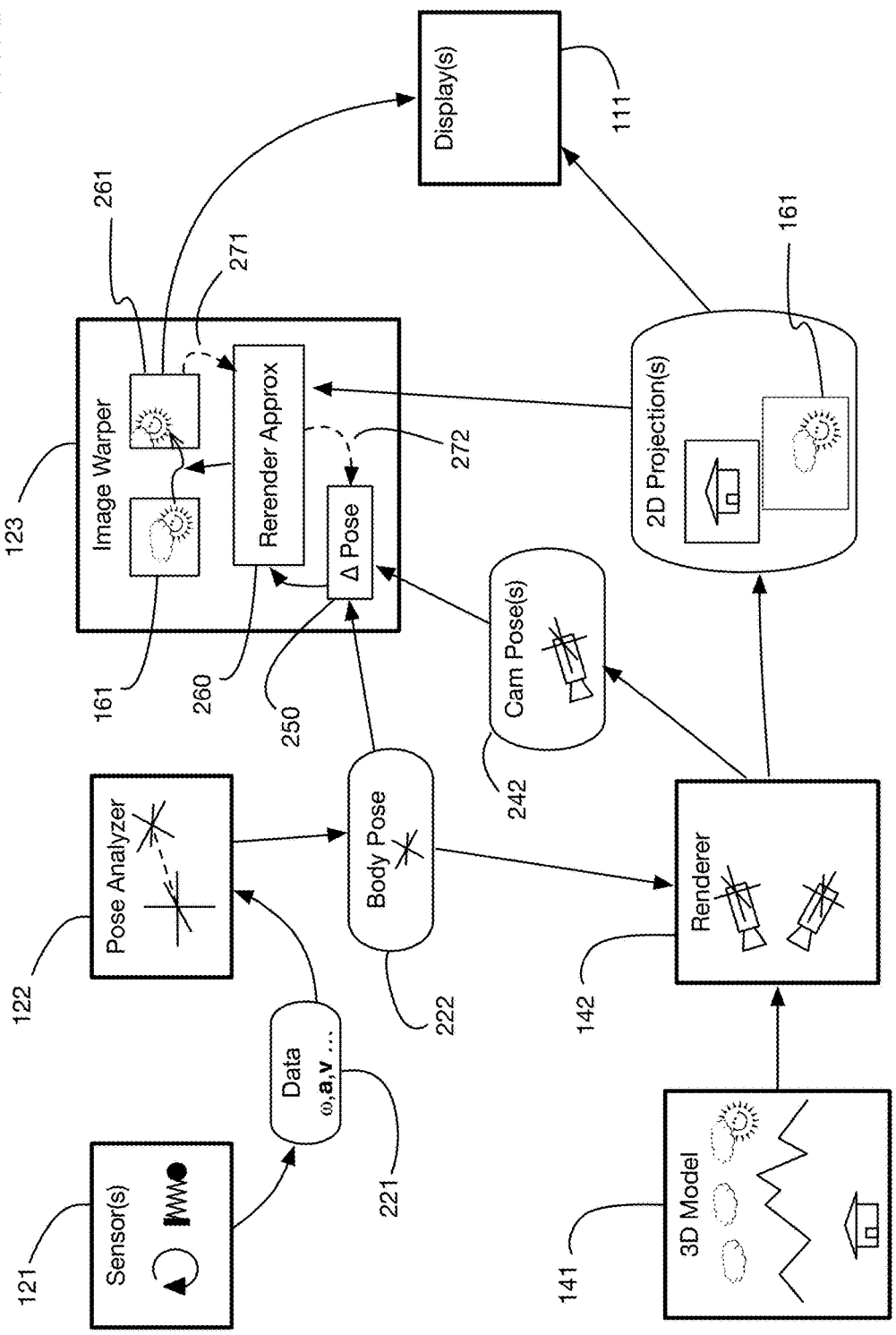
FIG. 2 shows a high-level architectural view of the embodiment shown in FIG. 1.

FIG. 2 shows a conceptual block diagram of the embodiment of FIG. 1, illustrating the main data paths. Sensor (or sensors) 121 generate sensor data 221. This sensor data may include, for example, angular velocity data, acceleration data, velocity data, or any other data generated by any of the types of sensors discussed above or any sensor that may measure any aspect of the pose of a user's body part. The sensor data 221 is sent to pose analyzer 122, which generates body pose 222 from the sensor data. Body pose 222 may include multiple poses, depending on the embodiment; for example in one or more embodiments with eye trackers, body pose 222 may have a separate pose for each of the user's eyes. Body pose 222 is sent to scene renderer 142, which takes 3D scene model 141, and renders one or more 2D projections such as 161. 2D projections 161 are sent to displays 111. The scene renderer 142 also generates virtual camera poses 242 for the virtual camera or virtual cameras used to generate the 2D projections. For some subsequent changes in pose, the new body pose 222 and the virtual camera pose 242 may be sent to image warper 123. Embodiments may use various techniques to determine when, whether, and how to use rerendering via the image warper vs. full rendering iterations via the scene renderer. Image warper 123 calculates a change in pose 250. The change in pose 250 and the original 2D projections 161 are sent to the rerendering approximation 260, which performs the image warper to transform 2D projection 161 into modified 2D projection 261, which is then sent to display 111. In some embodiments the rerendering approximation process may be repeated multiple times before another full rendering of the scene. Embodiments may employ various techniques for repeated rerendering approximations. In some embodiments for example the repeated rerendering may be "iterative": warped projection 261 may be sent back to the rendering approximation 260 on path 271, for another iteration of warping when a new body pose 222 is available. In these iterative embodiments of repeated rerendering, the pose of the last warped image may also be provided on path 272 to the pose change calculation 250 so that pose changes represent only the change from the last warped image. In other embodiments the repeated rerendering may instead by "cumulative": original 2D projection 111 may be saved, and repeated rerendering approximations may be performed on the original projection rather than on the last warped image. Some embodiments may employ combinations of these iterative and cumulative rerendering approaches.

FIG. 3 shows an illustrative "swimlane" process timing diagram of some of the key steps described above. This diagram presumes that a 3D scene has been previously rendered and is currently displayed on the displays. Initially the Pose Analyzer calculates a pose at 303, and sends this pose to the Scene Renderer. The Scene Renderer launches a Render process 301 which is time-consuming. If the system waited for the Render process 301 to complete, the display would not be updated until the new display 302 is available. To provide a lower latency display that is responsive to user's movements, the Pose Analyzer sends the pose 303 to the Image Warper as well. The Image Warper executes a rapid Rerender process at 304 to modify the current display based on the change in pose. This Rerender process finishes quickly resulting in new display 305. This example illustrates how the Image Warper provides for a lower latency virtual reality display, by executing a fast, approximate rerendering to update a display rather than waiting for a time-consuming full rendering process.

In FIG. 3, this process of rerendering repeats a second time while the Render process 301 is calculating, and then a third time when pose calculation 306 is sent to the Image Warper for rerendering, to generate display 308. After Render 301 is complete, the new 2D projection is available for subsequent rerendering steps. In this illustrative embodiment, full Rendering 301 and approximate Rerendering 304 are interleaved. Some embodiments may employ different strategies to mix full rendering and approximate rerendering as desired. The timing shown in FIG. 3 of three approximate rerendering steps occurring while full rendering is executing is simply illustrative; embodiments may employ any desired or required frequency and timing of these steps based on latency requirements, processor capacity, and the types of rerendering approximations used.

Embodiments of the system may employ various types of approximate rerendering techniques to achieve the desired latency. In one or more embodiments, the approximate rerendering consists of or includes a pixel translation that simply shifts all pixels of the 2D projection by an appropriate pixel translation vector. One advantage of this approach is that pixel translation can be executed very rapidly; for example in some embodiments it may be achieved simply by modifying an offset address for the display memory used by a graphics processing unit. In some embodiments pixel translation may be supported directly by the display hardware. FIG. 4 illustrates an embodiment that uses a pixel translation vector for rerendering approximation. Initially user 101 has a pose indicated by view vector 401a. The user is observing 3D scene model 141a, which includes for illustration three objects: a sphere 441a, a pyramid 441b, and a box 441c. (These objects are illustrated in two dimensions in FIG. 4 for simplicity, but in general the 3D scene models may contain three dimensional shapes.) The objects are located at different distances from the user 101, with 441a closest and 441c furthest away. The render process 142a generates 2D projection 161. As illustrated in 161, the rendering process shows the depth of the various objects, with the sphere 441 appearing largest since it is closest to the user. The rendering process also reflects occlusion of objects; since sphere 441a is in front, it partially obscures objects 441b and 441c.

After this initial rendering, user 101 moves to the right, with new view vector 401b. The new pose of the user (which reflects the new view vector) is compared to the original pose with the pose change comparator 250. This pose change is sent to the approximate rerender 260, which calculates a pixel translation vector 460 that approximates the change to the 2D projection based on the user's movement. Since the user moved to the right, the pixel translation vector is a shift of pixels leftwards. Applying the pixel translation vector 460 to the original 2D projection 161 results in modified image 261. All pixels in the scene are shifted left by the same amount.

FIG. 4 also illustrates how the rerendering approximation differs from a full rendering based on the new pose. If the new pose 401b is sent to the Scene Rendering process 142b, the resulting 2D projection is 462. This new 2D projection is a fully accurate representation of the user's new view. For example, in the updated 2D projection 462, the sphere 441 shifts leftward more than the box 441c, since it is closer to the user. Because the rendering process 142b takes the depth of the objects into account in rendering the scene, these relative shifts are correctly rendered. In contrast, the approximate rerendering 260 via pixel translation vector 460 captures the basic movement of the scene—the user moves right so the pixels shift left—but it is nevertheless an approximation that does not take into account the 3D scene model. The advantage of the approximate rerendering is that it can be performed very quickly, particularly with pixel translations, resulting in low latency display that is very responsive to the user's movements. Different embodiments of the system may mix full rendering and approximate rerendering as needed or desired to make the appropriate tradeoffs between accuracy and low latency based on the application.

One or more embodiments of the system may use hardware acceleration to modify the pixels of a display to perform pixel translations or other image warping operations. FIG. 4A illustrates an example of an embodiment with hardware support for pixel translation in the monitor hardware. In some embodiments hardware support may be provided in graphics processing units or in other system components as well. In FIG. 4A, monitor 110 includes hardware 4A01 that drives the monitor output. This hardware has direct support for implementing pixel translation 460. The monitor hardware includes a frame buffer 4A02 that stores pixel values. To display the pixel value at a screen address 4A05, corresponding for example to pixel 4A04 on the display 110, the hardware adds offsets 4A03 to the screen address 4A05 to obtain a frame buffer address 4A06, which in this example points to frame buffer pixel 4A07. The offset 4A03 is set based on pixel translation 460. Changes to the pixel translation can be rerendered very quickly by the display hardware by updating the offset 4A03. In one or more embodiments the display hardware may provide support for additional image warping features, such as for example filling of holes with interpolated pixel values, blurring of edge regions, rotations in addition to translations, or any other desired warping transformations. One or more embodiments may provide hardware acceleration in other system components instead of or in addition to in display hardware, such as for example in graphics processing units or in coprocessors.

In one or more embodiments, approximate rerendering may be used only when a user makes relatively small changes in pose. In some cases the accuracy of approximate rerendering may be very good for small changes in pose, but it may be poorer for large changes in pose. Therefore limiting approximate rerendering to small changes in pose may be appropriate in some embodiments. FIG. 5 illustrates an embodiment that employs this strategy. The virtual camera pose 242 used to generate a previous 2D projection is compared to a user's current pose 222 to generate a change in pose 250. This change in pose is compared at 501 to a threshold. If the change in pose is below a threshold, rerendering approximation 260 is executed for a low latency update to the display; otherwise a full rendering 142 is executed to generate new 2D projections 161. Embodiments may use various methods to compare pose changes to threshold values. For example, for pose changes that are translations, the distance moved by the user may be a metric that is compared to a threshold value. For pose changes that are rotations, the angle of rotation may be a metric that is compared to a threshold value. For pose changes that combine translations and rotations, weighted sums of translation distance and angular change may be compared to a threshold, or translations and angle changes may each be employed to respective thresholds. These examples are illustrative; embodiments may use any desired function to compare pose changes to any threshold value or values to decide when to execute approximate rerendering.

FIG. 6 shows an illustrative swimlane timing diagram for the embodiment shown in FIG. 5 that compares pose changes to a threshold. Pose change 601 is determined to be a small change since it is below the threshold value. Therefore the rerendering approximation 304 is executed to generate display 304. Similarly the next 2 pose changes are small, and rerendering approximations are executed. Afterwards pose change 602 is determined to be large (greater than the threshold); therefore a full rendering operation 301 is initiated. In this illustrative embodiment, the system pauses display updates during time 610 while the rendering process 301 is executing. Thus the next update to the display 302 occurs when rendering 301 is complete.

In some embodiments, naïve parallel interleaving of full rendering and approximate rerendering may result in display updates that appear to be out of sequence. Returning to FIG. 3, the three approximate rerendering steps beginning at 304 execute in parallel with the full rendering process 301. While this parallelism achieves low-latency update of displays (for example at 306 and 308), it may result in timing artifacts that negatively affect the user's experience. For example, the user observes display update 308, which is based on the user's pose 306. Immediately afterwards, the user observes display update 302, which is based on the user's pose 303. Thus the display at 302 may appear to the user to go backwards relative to the most recent display 308 which was generated by a rerendering approximation. For very small changes in pose these artifacts may not be noticeable, but in some embodiments they may compromise the virtual reality experience.

One solution to these timing artifacts is to prevent parallel execution of full rendering and approximate rerendering altogether. Such an embodiment is illustrated in FIG. 6. In this embodiment, approximate rerendering occurs for small pose changes, and full rendering occurs for large pose changes. Moreover, approximate rerendering is paused during full rendering. Thus the user never observes the timing issues that may be visible for example in FIG. 3. However, the embodiment illustrated in FIG. 6 achieves this consistency at the expense of latency: for example the delay 610 in display updates during rendering 301 may be perceived by the user as a lack of responsiveness of the system.

Embodiments of the system may employ a more sophisticated interleaving strategy that achieves consistently low latency without introducing the types of timing artifacts illustrated in FIG. 3. These embodiments generate full rendering in parallel with approximate rerendering, and in addition they perform post-rendering corrections on the fully rendered images to synchronize them with updates that have occurred since the full rendering process began. FIG. 7 illustrates an embodiment that applies post-rendering corrections, and FIG. 8 shows an associated swimlane diagram for the key processing steps. Turning first to FIG. 8, in this illustrative embodiment, small changes in pose generate approximate rerendering, and large changes in pose generate full rendering. For example, pose change 601 is small (compared to a designated threshold value); hence approximate rerendering 304 is executed to generate display update 305, with relatively low latency. Similarly the subsequent two pose changes are small and generate approximate rerendering. Pose change 602 is large; hence the system initiates full rendering 301 which is based on the pose at 602. Because rendering 301 is time-consuming, pose changes 801, 802, and 803 are received during rendering 301. Since each of 801, 802, and 803 are small changes, rerendering approximations are performed to generate display updates for each of these pose changes. After rendering 301 completes, instead of displaying the output of 301 directly, the output of 301 is corrected by process 801 before it is displayed. The correction 810 uses the cumulative pose changes 801, 802, and 803 that occurred after the initiation of 301 to synchronize the display with the most recent pose.

FIG. 7 shows a block diagram of an embodiment that implements the process illustrated in FIG. 8. At time $t_1$ pose 222a is sent to renderer 142. Eventually the renderer generates 2D projection 161a; this projection was based on virtual camera pose 242a, which corresponds to pose 222a at time $t_1$. One or more pose updates have been received and processed between time $t_1$ and the availability of 2D projection 161a; the most recent such update is body pose 222b received at time $t_2$. Therefore the 2D projection 161a is not sent directly to display 111. Instead it is sent to image warper 123, which will correct it for pose changes that have occurred since the beginning of the rendering process. Image warper 123 calculates virtual camera pose 242b corresponding to the most recent body pose 222b, and compares it to the virtual camera pose 242a used for rendering projection 161a. The difference in these virtual camera poses is applied to post rendering correction 701, which modifies 2D projection 161a based on recent pose changes to generate corrected 2D projection 161b, which is sent to display 111. One potential benefit of such an embodiment is that displayed images will reflect the most recent pose data received from the sensors. Another potential benefit is that approximate rerendering may be interleaved in parallel with full rendering for improved latency without introducing timing artifacts.

Approximate rerendering and post rendering correction may significantly reduce the latency between changes in pose and updates to the display that reflect these changes. However, the processes of measuring pose, generating an approximate rerendering, and transferring data to the display, continue to introduce some latency even when these improvements are in place. FIG. 8A illustrates this potential issue. A pose measurement starts at time 8A01 ($t_1$). After pose measurement completes, a rerendering approximation is calculated and transferred to the display; the display update competes at time 8A02 ($t_2$). Although a long-latency full rendering is avoided, there remains elapsed time 8A03 ($\Delta t$) between the start of pose measurement and the completing of the display update. The display update therefore lags the true pose by this amount $\Delta t$.

One or more embodiments may employ pose prediction to further reduce this latency. An example of this approach is illustrated in the lower half of FIG. 8A. A pose measurement 8A05 occurs with resulting pose $Q_1$. Instead of passing this pose $Q_1$ directly to the image warper, the system uses the known delay 8A03 ($\Delta t$) between pose measurement and display to predict what the pose will be at the time 8A30 that the display update will complete. In this illustrative embodiment, an extrapolation of pose changes is made using the previous pose sample 8A04, which measured pose $Q_0$. Assuming sampling interval $\Delta s$ between pose measurements, a pose predication 8A06 is calculated as $Q_2 = (Q_1 Q_0^{-1})^{(\Delta t/\Delta s)} Q_1$. This calculation considers poses to be rigid body transformations of three-dimensional space, with multiplication used to represent composition of these transformations. The predicted pose 8A20 ($Q_2$) is provided to the image warper for the rerendering approximation. Thus the display process which completes at time 8A30 is synchronized with the time of the predicted pose used to generate the display.

This pose prediction calculation 8A06 is an illustrative example; one or more embodiments may use any method to predict a future pose based on one or more previous pose samples and on any other available information. Any method of predicting a future trajectory for the location or orientation of any body part may be used by one or more embodiments. Prediction methods used by one or more embodiments may also for example take into account known constraints on the motion of the user. One or more embodiments may use adaptive pose prediction techniques that monitor the user's movements over time to predict the most likely subsequent movements based on previous movements.

FIG. 8A illustrates the use of pose prediction for image warping. One or more embodiments may use similar pose prediction techniques for full rendering as well. The discussion above for pose prediction for image warping applies to full rendering as well. One or more embodiments may generate a predicted pose that is sent to the full rendering process, where the predicted pose takes into account expected pose changes between the time of the pose measurement and the completion of the display update after full rendering. One or more embodiments may use pose prediction techniques for either or both of image warping and full rendering.

In some embodiments the approximate rerendering transformations applied by the image warper may result in "holes" in the transformed images with missing pixels. For example, returning to the embodiment illustrated in FIG. 4, the image warper shifts pixels to the left via pixel translation vector 460. This results in a "hole" 470 on the right edge of transformed image 261 that is missing pixels. Embodiments may employ various strategies or combinations of strategies to handle these holes. A very simple strategy employed by one or more embodiments is to fill holes with a relatively "neutral" background color; in some applications this may provide sufficient realism for small pose changes. However in other applications this simple approach may not be sufficient.

One or more embodiments may fill holes by rendering 2D projections that are larger than the displays. In these embodiments warping of the larger 2D projection may result in an updated projection that still fits entirely within the display area. FIG. 9 illustrates an embodiment that employs this strategy. In this embodiment, the scene renderer generates an extended 2D projection 901 from 3D model 141; this extended projection is larger than the display area. The displayed image 161 is a subset of the rendered area 901. For illustration we show the effect of an image warper 123 that applies a rightward pixel translation to the image. An embodiment that did not employ a hole-filling strategy would generate transformed image 111a, which has missing pixels in region 911 on the left edge of the display. In the embodiment of FIG. 9, the pixels of the extended rendered projection 901 are saved in an offscreen cache. The image warper then pulls pixels from this offscreen cache as needed to fill holes generated by the warping. In FIG. 9, pixels from the mountain object 920 are pulled from the offscreen cache to fill hole 911, resulting in an improved rerendered projection with object 921 filling the hole. Embodiments may use any desired size and shape for the offscreen pixel cache.

Figure 10:
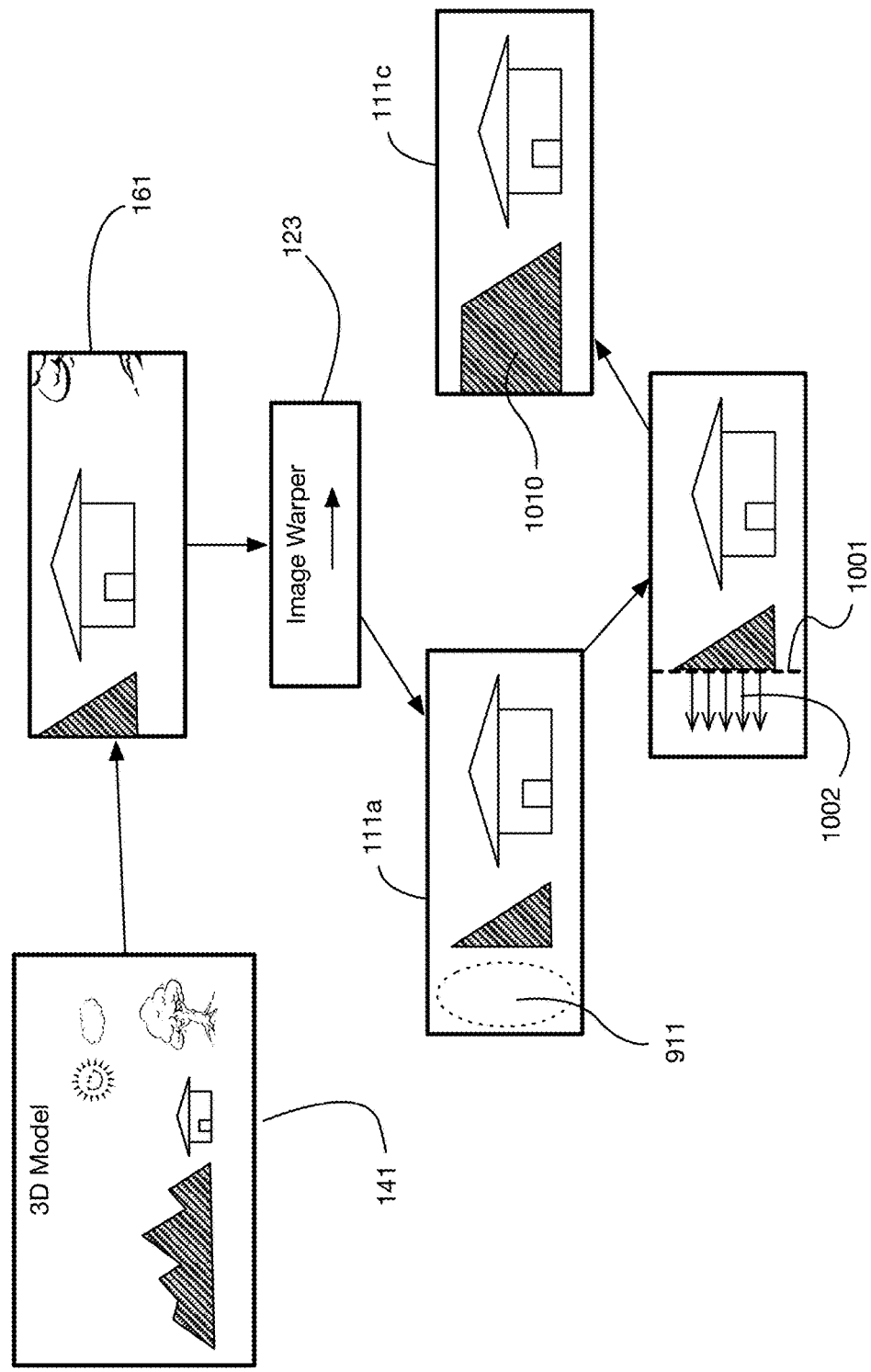
FIG. 10 illustrates an embodiment of the system that fills holes generated by low-latency rerendering transformations by extending pixels from the image boundary.

One potential drawback of the strategy of generated an extended rendered area is that it requires additional processing for the rendering of more pixels; thus it may exacerbate latency issues due to rendering delays. One or more embodiments may employ a hole-filling strategy that instead generates pixel values for the missing pixels based on some features of the warped image. For example, the embodiment of the system illustrated in FIG. 10 fills in pixel values by propagating pixels outward from the boundaries of the warped image into the regions with holes. For illustration, image warper 123 shifts pixels of 2D projection 161 to the right, resulting in hole 911 that is missing pixels. In this embodiment, the image warper finds the boundary 1001 that corresponds to the original left edge of projection 161; it then propagates pixel values from this boundary to the left with propagation 1002. This pixel propagation results in filled region 1010 rather than the hole 911. In this illustrative embodiment, the resulting image 111c has no noticeable hole; however the resulting shape of the mountainous area does not correspond precisely to the shape in the original 3D scene model 141. Nevertheless this simple strategy of propagating pixels from the boundary may provide adequate realism in some applications. One or more embodiments may employ other strategies to approximate pixel values in holes; for example one or more embodiments may locate a series of pixels in the warped image that are relatively close to the location of a missing pixel, and interpolate these pixel values to fill the hole.

Figure 11:
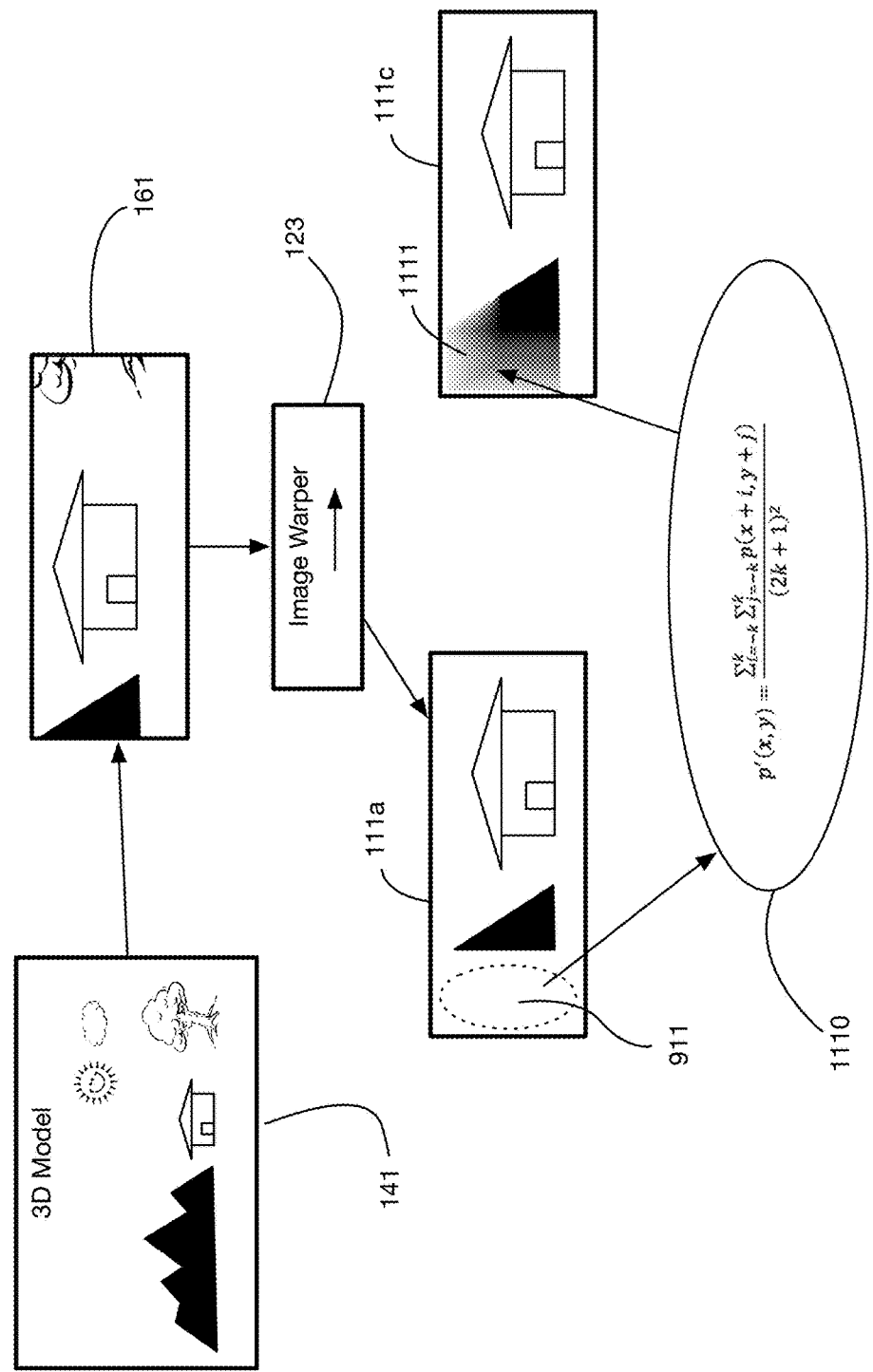
FIG. 11 illustrates an embodiment of the system that fills holes generated by low-latency rerendering transformations by blurring pixels near the image boundary.

Because pixel-filling approaches that propagate pixels from boundaries (or use similar heuristics) result in regions on the edges of displays that are not entirely faithful to the original 3D scene model, one or more embodiments may employ various blurring approaches to make these regions appear less sharp. By blurring the filled in regions, the approximate pixel values may be less noticeable to the viewer. FIG. 11 illustrates an embodiment that utilizes such a blurring. As before, the image warper shifts pixels to the right, resulting in hole 911 in warped image 111a. Then blurring transformation 1110 is applied to the pixels in hole 911. The illustrative blurring transform 1110 simply averages pixel values across a square region center centered at the coordinates of each missing pixel. The resulting blurred region 1111 in 111c has no obvious hole with missing pixel values; moreover the blurring has no obvious artifacts like the flat mountaintop showing in FIG. 10, region 1010. The blurring transformation 1110 which averages values in a local neighborhood is simply illustrative; embodiments may employ any desired transformation on the pixels of regions with holes, or on any pixels near to these regions, to achieve a desired blurring effect. For example, instead of a simple averaging, a Gaussian blur filter may be employed by one or more embodiments.

Figure 12:
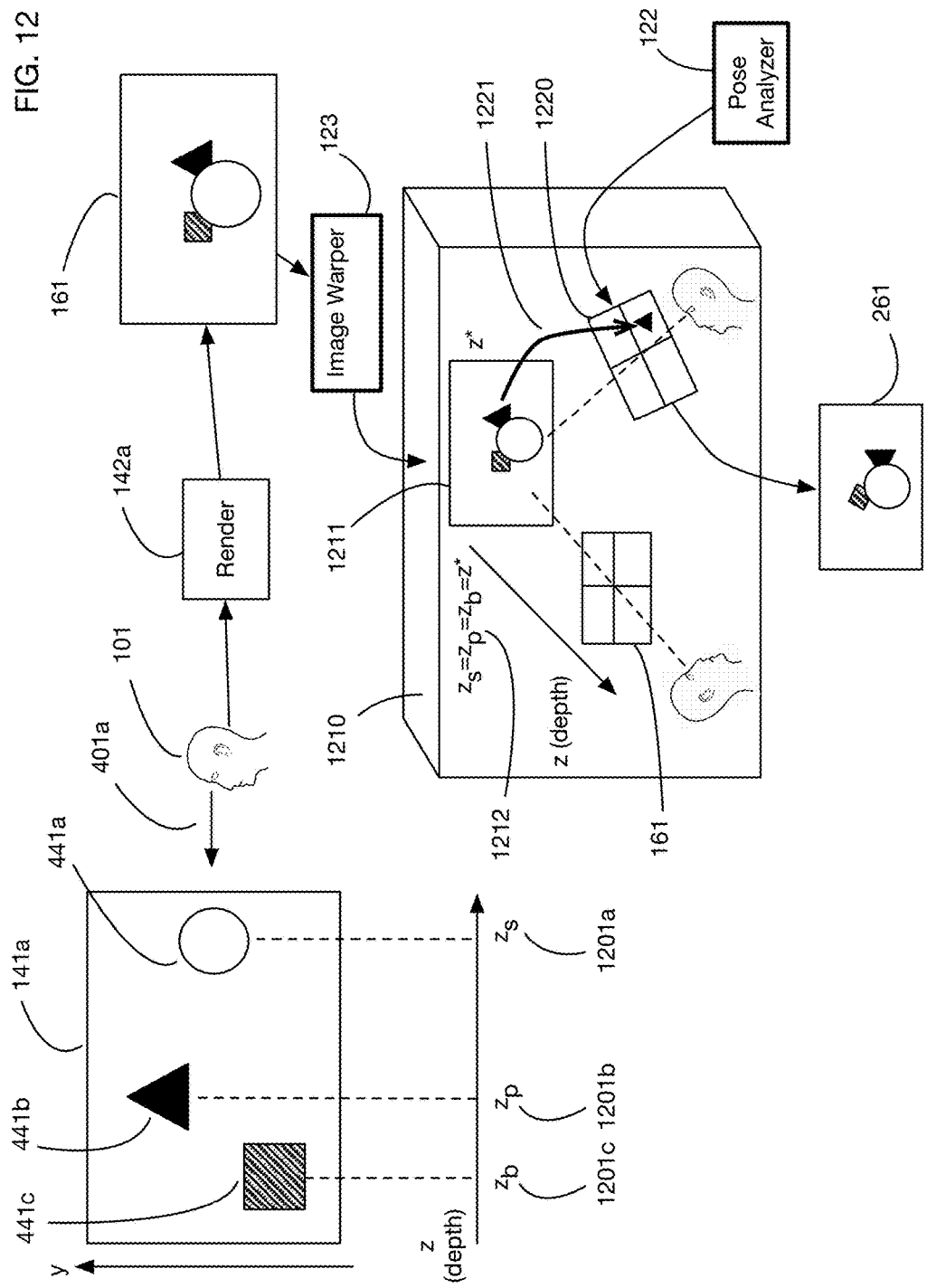
FIG. 12 illustrates an embodiment of the system that generates a low-latency rerendering transformation by projecting the rendered image onto a plane, and then rerendering onto a modified image plane corresponding the user's modified pose.

We now discuss illustrative approaches for image warping transformations. These transformations are rerendering approximations, rather than full rendering from the 3D scene model. In one or more embodiments, a rerendering approximation is generated by first creating a simplified 3D model from the 2D projections, and then reprojecting this simplified 3D model onto new view planes based on user's modified pose. For example, a simplified 3D model may be formed by mapping the 2D projections generated by the renderer onto one or more surfaces in 3D space. FIG. 12 illustrates an embodiment of the system that uses this approach for approximate rerendering. 3D scene model 141a consists of three objects: a sphere 441a close to user 101, a pyramid 441b further from the user, and a box 441c furthest from the user. FIG. 12 shows a two-dimension projection of the 3D scene model onto the y-z plane; here the z-axis points towards the user and the user is located at z=0 (a convention often used in 3D graphics applications), the y-axis points upwards, and the x-axis points towards the user's right. The sphere is at distance $z_s$ from the user; the pyramid is at distance $z_p$ from the user; and the box is at distance $z_b$ from the user. (These z-values are negative, in conformance with the orientation of the z-axis.) Scene renderer 142a generates 2D projection 161 of the 3D model. User 101 then changes pose, and image warper 123 performs a rerendering approximation to generate modified image 261. The rendering approximation first projects the 2D projection 161 onto plane 1211 in simplified 3D model 1210; this plane 1211 is at distance z* from the user. The value z* may be fixed, or it may be provided by the scene renderer 142a based on an average or typical distance of objects in the 3D model 141a from the user. In the simplified 3D model 1210 used by the image warper, all objects appear in 3D space at the same depth z* from the user, because all objects have been projected onto the single plane 1211 with depths 1212 of $z_s=z_p=z_b=z^*$. This does not match the actual depths 1201a, 1201b, and 1201c in the original 3D scene model 141a; hence the image warper is employing an approximate rerendering for efficiency, which simplifies the 3D rerendering model 1210 compared to the real 3D scene model 141a.

From the plane 1211 at depth z*, the image warper reprojects pixels onto modified view plane 1220 corresponding to the user's new pose. The orientation of plane 1220 is based on data received from pose analyzer 122. This reprojection generates modified image 261. In the illustrative example shown in FIG. 12, view plane 1220 is rotated clockwise compared to the initial view plane for image 161; hence the objects in 261 are rotated counterclockwise to form the rerendering approximation.

The embodiment illustrated in FIG. 12 generates a rerendering approximation by mapping the original 2D projection onto a single plane parallel to the user's original view plane, and then reprojecting that plane onto the user's modified view plane. One or more embodiments may map 2D projections onto other surfaces to perform approximate rerendering. For example, some embodiments may multiple portions of the 2D projections onto multiple planes. One or more embodiments may map 2D projections onto one or more curved surfaces, such as for example a sphere or a cylinder.

Mathematically, one or more embodiments may implement the rerendering approximation illustrated in FIG. 12 as follows. This implementation is illustrative only; embodiments may employ any desired transformations, algorithms, mappings, or image warpings to perform rerendering approximations. We assume for ease of illustration that a 2D projection is a rectangular image w pixels wide and h pixels high, and that the width w represents a horizontal field of view of f radians. We assume that the 2D projection was generated using a perspective projection transform of the 3D scene model onto view plane z=−1, followed by a scaling from spatial coordinates to pixel coordinates of s=w/2 tan f/2. The view plane z=−1 is mapped onto plane z=−z* to form the 3D model for rerendering; thus point (x,y) of the view plane is mapped to coordinates (z*x,z*y,−z*). The subsequent change to the user's pose is modeled as a rigid body transformation T of the view plane, which in general consists of a rotation R of angle Δθ around unit vector axis $\hat{\omega}$ followed by a translation by vector Δr. Each point (z*x, z*y,−z*) is then projected onto this new view plane, and rescaled from spatial coordinates to pixel coordinates by the same scaling factor of $$s = w/2\tan\frac{f}{2},$$

to generate the rerendering approximation.

Derivation of the projection onto the new view plane may be simplified by recognizing that transforming the view plane by transformation T is equivalent to transforming the points on the plane z=−z* by $T^{-1}$, and then mapping these points to the original view plane z=−1. Mapping points to the view plane z=−1 is straightforward: point (x,y,z) maps to $$\left(-\frac{x}{z}, \frac{y}{z}, -1\right).$$

Thus the rerendering approximation includes the following steps:

$$(x, y) \to (z^*x, z^*y, -z^*) =$$
$$(x_0, y_0, z_0) \to T^{-1}(x_0, y_0, z_0) = (x_1, y_1, z_1) \to \left(-\frac{x_1}{z_1}, -\frac{y_1}{z_1}\right) = (x', y')$$

Mapping $T^{-1}$ consists of a translation by vector $\Delta r$ followed by a rotation R of angle $-\Delta\theta$ around unit vector axis $\hat{\omega}$ a now consider the case of small changes in the user's pose, where both $\Delta r$ and $\Delta\theta$ are small. In this case, rotation R can be approximated as $R \approx I + S(\hat{\omega})\Delta\theta$, where S is the cross-product matrix ($S(u)v = u \times v$), and I is the identity matrix. For small changes, the effects of translation and rotation are approximately additive; thus $T^{-1}r \approx r - \Delta r - (\hat{\omega} \times r)\Delta\theta$. Letting $\Delta = (\Delta r_x, \Delta r_y, \Delta r_z)$ and $\hat{\omega} = (\omega_x, \omega_y, \omega_z)$ we have $T^{-1}(x_0,y_0,z_0) = (x_0 - \Delta r_x - \omega_y z_0 \Delta\theta + \omega_z y_0 \Delta\theta, y_0 - \Delta r_y + \omega_x z_0 \Delta\theta - \omega_z x_0 \Delta\theta, z_0 - \Delta r_z - \omega_x y_0 \Delta\theta + \omega_y x_0 \Delta\theta)$. Thus $$x' = -\frac{x_0 - \Delta r_x - \omega_y z_0 \Delta\theta + \omega_z y_0 \Delta\theta}{z_0 - \Delta r_z - \omega_x y_0 \Delta\theta + \omega_y x_0 \Delta\theta}$$
$$= -\frac{z^*x - \Delta r_x + \omega_y z^* \Delta\theta + \omega_z z^* y \Delta\theta}{-z^* - \Delta r_z - \omega_x z^* y \Delta\theta + \omega_y z^* x \Delta\theta}$$
$$= \frac{x - \frac{\Delta r_x}{z^*} + \omega_y \Delta\theta + \omega_z y \Delta\theta}{1 + \frac{\Delta r_z}{z^*} + \omega_x y \Delta\theta - \omega_y x \Delta\theta}$$

and $$y' = -\frac{y_0 - \Delta r_y + \omega_x z_0 \Delta\theta - \omega_z x_0 \Delta\theta}{z_0 - \Delta r_z - \omega_x y_0 \Delta\theta + \omega_y x_0 \Delta\theta}$$
$$= -\frac{z^*y - \Delta r_y - \omega_x z^* \Delta\theta - \omega_z z^* x \Delta\theta}{-z^* - \Delta r_z - \omega_x z^* y \Delta\theta + \omega_y z^* x \Delta\theta}$$
$$= \frac{y - \frac{\Delta r_y}{z^*} - \omega_x \Delta\theta - \omega_z x \Delta\theta}{1 + \frac{\Delta r_z}{z^*} + \omega_x y \Delta\theta - \omega_y x \Delta\theta}$$

These expressions can be further simplified for the case of small x and y, which corresponds to pixels relatively near the center of the original 2D projection. Continuing to assume that both $\Delta r$ and $\Delta\theta$ are small, many of the terms above are second-order expressions, such as for example $y\Delta\theta$. Ignoring these second order terms, we have approximately:

$$x' \approx \frac{x - \frac{\Delta r_x}{z^*} + \omega_y \Delta\theta}{1 + \frac{\Delta r_z}{z^*}}$$

$$y' \approx \frac{y - \frac{\Delta r_y}{z^*} - \omega_x \Delta\theta}{1 + \frac{\Delta r_z}{z^*}}$$

Furthermore for small $\Delta r$ the denominator can be ignored to first order, since $$\frac{1}{1 + \Delta r_z/z^*} \approx 1 - \Delta r_z/z^*,$$

and the product of $\Delta r_z/z^*$ with the terms in the numerators consists of second order terms. Thus we can use the rerendering approximation:

$$x' \approx x - \frac{\Delta r_x}{z^*} + \omega_y \Delta\theta$$
$$y' \approx y - \frac{\Delta r_y}{z^*} - \omega_x \Delta\theta$$

Using this approximation, all coordinates (x,y) are therefore shifted uniformly by translation $$(\Delta x, \Delta y) = \left(-\frac{\Delta r_x}{z^*} + \omega_y \Delta\theta, -\frac{\Delta r_y}{z^*} - \omega_x \Delta\theta\right).$$

This formula provides the coordinate translation in spatial coordinates of the simplified 3D model. To convert to pixel coordinates, we simply apply the scaling factor $$s = w/2 \tan\frac{f}{2}.$$

This yields the pixel translation vector $(s\Delta x, s\Delta y)$.

This derivation shows that an approximate rerendering can be performed using a simple pixel translation vector which is based on a simplified 3D model, and which is a good approximation for small pose changes and for pixels near the center of a display. The derivation shown considers both rotational pose changes and translational pose changes. One or more embodiments may consider only rotational pose changes. These embodiments may for example use a pixel translation vector of $(s\Delta x, s\Delta y) = (s\omega_y\Delta\theta, -s\omega_x\Delta\theta)$, which uses only the rotational components of the pixel translation vector. One or more embodiments may consider only translational pose changes. These embodiments may for example use a pixel translation vector of $$(s\Delta x, s\Delta y) = \left(-\frac{s\Delta r_x}{z^*}, -\frac{s\Delta r_y}{z^*}\right),$$

which uses only the translational components of the pixel translation vector. One or more embodiments may consider both rotational pose changes and translational pose changes. These embodiments may for example use the complete pixel translation vector derived above of $$(s\Delta x, s\Delta y) = \left(-\frac{s\Delta r_x}{z^*} + s\omega_y\Delta\theta, -s\omega_x\Delta\theta - \frac{s\Delta r_y}{z^*}\right).$$

The pixel translation vector approximation derived above is only one of many possible approximations to rerendering. One or more embodiments may use other approximations, or use the exact expressions derived above, to perform rerendering approximations.

Figure 13:
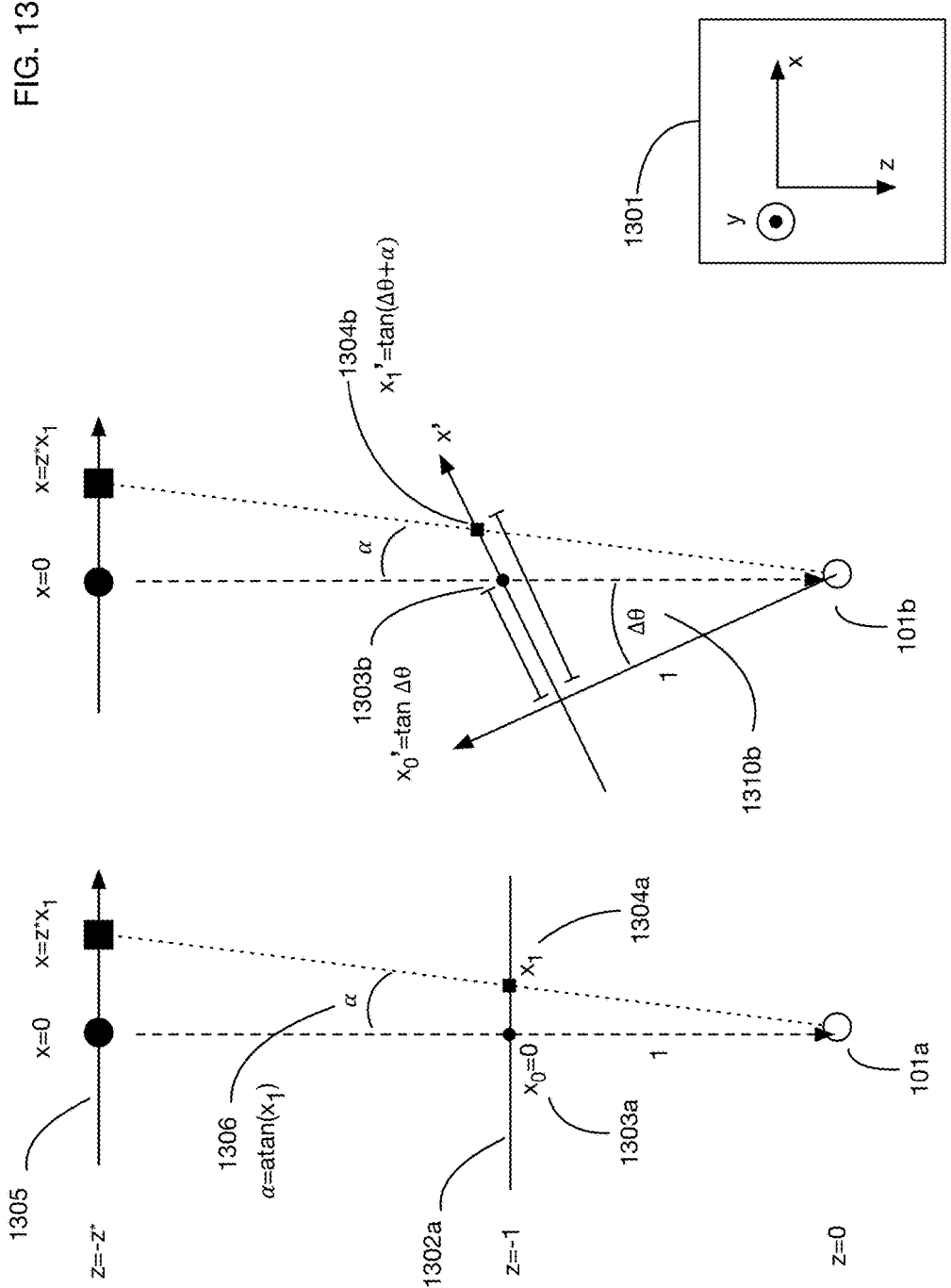
FIG. 13 shows a 2D model of an approximate rerendering calculation that generates a pixel translation vector from small angular rotations of a user's orientation.
Figure 14:
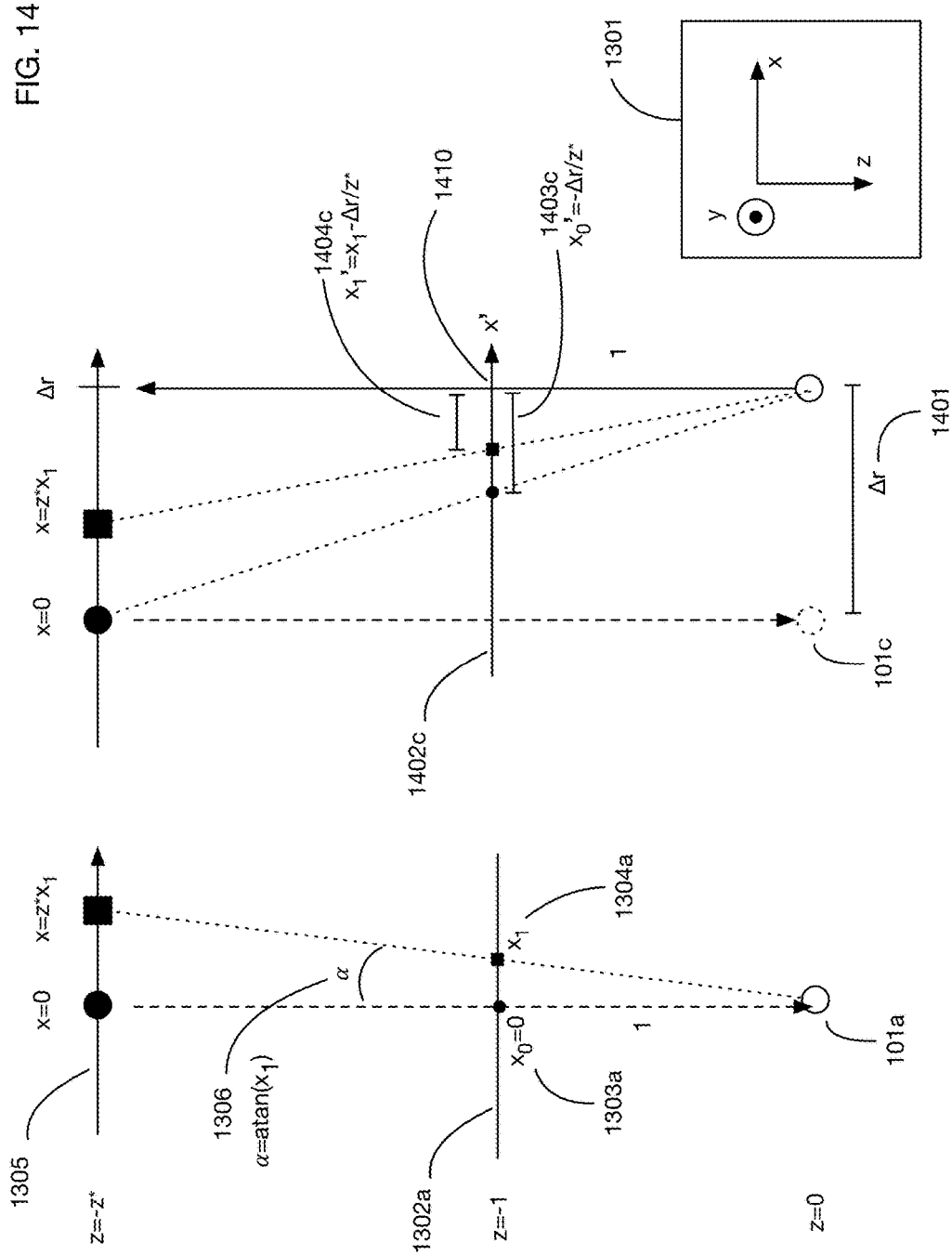
FIG. 14 shows a 2D model of an approximate rerendering calculation that generates a pixel translation vector from translations of a user's position.

Rerendering approximations using the above derived pixel translation vector are illustrated in FIGS. 13 and 14. FIG. 13 illustrates an example of a pose change consisting of a small angular rotation around the y axis. FIG. 13 shows a top view of the transformations, with the coordinate system 1301; the y axis points out of the page. Initially the user has pose 101a, and the 2D projection generated from the 3D scene model has a circle at x-coordinate 1303a (which is 0 since it is at the center of the display), and a square at x coordinate 1304a, which is at angle 1306 (α).

The rerendering approximation first maps these objects from the view plane 1302a onto plane 1305, located at distance z* from the user. The user then changes pose to 101b, by rotating the view vector clockwise around the y axis by angle $\Delta\theta$. The objects on plane 1305 are then reprojected on the new view plane. The circle, which was originally at $x_0=0$, has new x coordinate 1303b in the new view plane, with value $x'_0=\tan \Delta\theta$. Since we presume that $\Delta\theta$ is small, $\tan \Delta\theta \approx \Delta\theta$. The square which was originally at $x_1$ has new x coordinate 1304b in the new view plane, with value $x'_1=\tan(\Delta\theta+\alpha)$. If both $\Delta\theta$ and $\alpha$ are small, then $\tan(\Delta\theta+\alpha)\approx\tan \Delta\theta+\tan \alpha\approx\Delta\theta+x_1$. Thus both points $x_0$ and $x_1$ are shifted approximately by amount $\Delta\theta$. This result corresponds to the pixel translation vector formula derived above, with $\omega_y=1, \omega_x=\Delta r_x=\Delta r_y=0$.

FIG. 14 illustrates an example of a pose change consisting of a small translation along the x-axis by amount $\Delta r$. The initial user pose 101a, 2D projection 1302a, and mapping to plane 1305 are identical to those of FIG. 13. The user then changes pose to 101c, by moving to the right by amount 1401 ($\Delta r$). The view plane also moves to the right, the origin of the new x' axis 1402c perpendicular to the user's new position at point 1410. Objects on plane 1305 are then reprojected on the new view plane. The circle, which was originally at $x_0=0$, has new x coordinate 1403c in the new view plane, with value $x'_0=-\Delta r/z^*$. The square which was originally at $x_1$ has new x coordinate 1404c in the new view plane, with value $x'_1=x_1-\Delta r/z^*$. This result corresponds to the pixel translation vector formula derived above, with $\Delta r_x=\Delta r$, $\omega_x=\omega_y=\Delta r_y=0$.

One or more embodiments of the invention may use variable resolution rendering across one or more displays. The resolution of human vision is highest in the center of the field of view; therefore reduced resolution rendering on the sides of the field of view may not compromise a user's viewing experience. Moreover, reducing rendering resolution in selected display regions may improve rendering speed, and hence may reduce latency. Although shown in most examples as higher resolution in the center of the screen, embodiments may employ eye tracking to provide higher resolution at the area where an eye is pointed as well. In one or more embodiments, the center of the screen for each eye may be higher resolution that the outer edges of the screen (or screens). In other embodiments, or if programmatically altered via a user input, the center of the area that the eye is pointed at may be displayed at higher resolution, e.g., in embodiments that employ an eye tracker.

Figure 15:
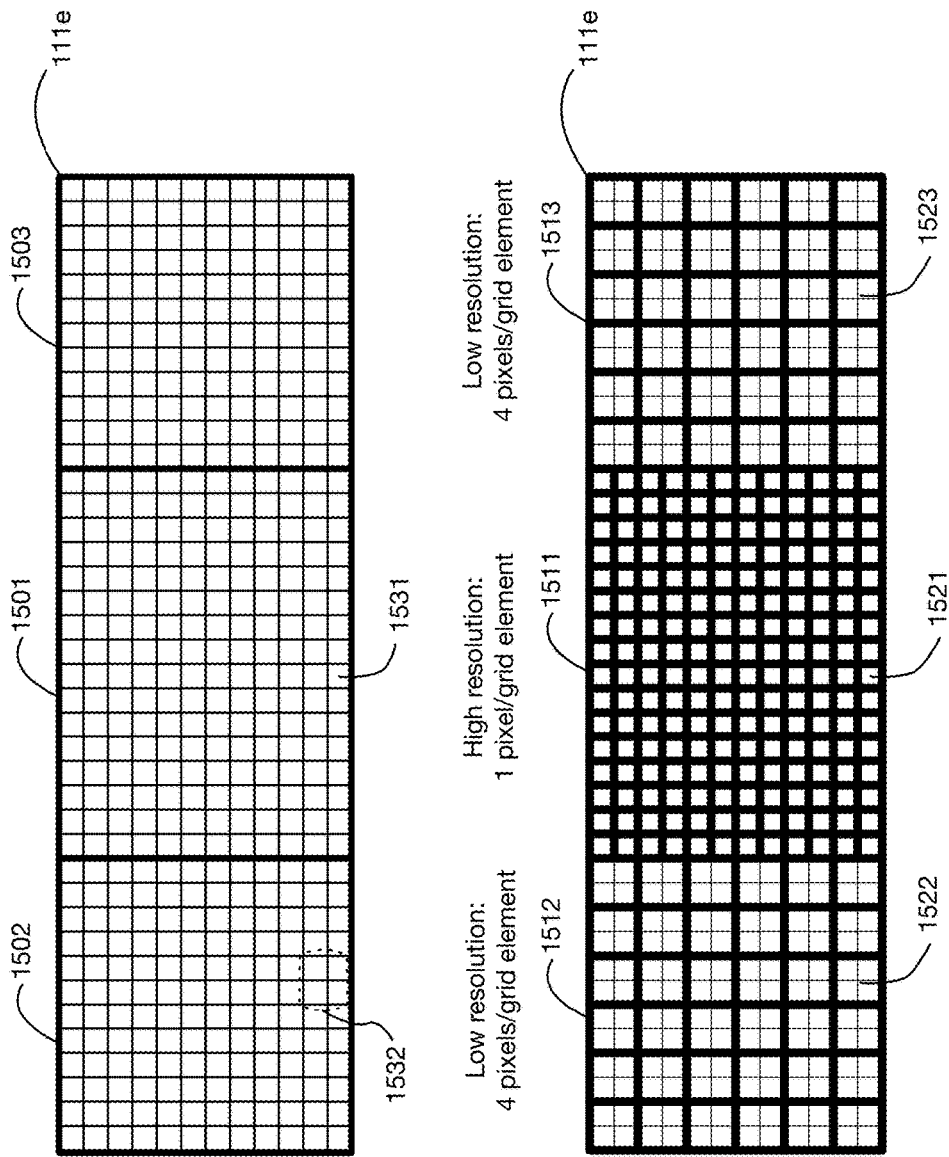
FIG. 15 illustrates an embodiment of the system that partitions a display into a high resolution center region and two low resolution side regions; rendering onto the low resolution regions uses coarser grid elements that comprise multiple pixels.

FIG. 15 illustrates an embodiment of the system that uses variable resolution rendering, for example to reduce rendering time and improve latency. Display 111e is partitioned into three regions: center region 1501, left region 1502, and right region 1503. This partitioning is illustrative; one or more embodiments may partition any number of displays into any number of regions. Regions may be of any size, shape, and dimensions. In the example shown in FIG. 15, display 111e comprises a rectangular array of pixels, such as pixel 1531. This is a common configuration, but embodiments may employ displays of any shape, size, dimensions, and pixel arrangements. The pixel densities (for example, per square centimeter) of regions 1501, 1502, and 1503 are approximately equal. Thus in this illustrative example, the hardware resolutions of the display regions are approximately equal. The system uses rendering optimizations to make the effective rendered resolution of the side regions 1502 and 1503 less than the effective rendered resolution of the center region 1501. The system partitions each display region into a grid of grid elements, where a grid element may comprise one or multiple pixels. For example, center region 1501 is partitioned into grid 1511, with one pixel per grid element. For example, grid element 1521 in grid 1511 contains only pixel 1531. Left region 1502 is partitioned into grid 1512, and right region 1503 is portioned into grid 1513. These side grids have 4 pixels per grid element. For example, grid element 1522 in left grid 1512 contains the 4 pixels 1532. Similarly grid element 1523 in right grid 1513 contains 4 pixels. Higher ratios of pixels per grid element correspond to lower resolution rendering in those regions. By combining pixels in the side regions into larger grid elements, the system may reduce the computational requirements for rendering in these regions, thus improving performance and potentially reducing latency.

As an illustration of the potential savings in rendering time and computation resources achieved by one or more embodiments of the invention, assume for example that a display contains p pixels, and that a fraction s of the pixels of a display are contained in one or more low resolution regions, wherein the ratio of pixels per grid element is greater than 1. Assume also that the average ratio of pixels per grid element in these low resolution regions is r. Rendering time may be roughly proportional to the number of grid elements e, which is $e=p(1-s)+ps/r$. The rendering time for an un-optimized system (where each pixel is separately rendered) is proportional to p. Thus the ratio of rendering time for an embodiment of the system to the rendering time for an un-optimized system (which renders each pixel separately) is $f=(1-s)+s/r$. For the embodiment illustrated in FIG. 15, s=0.6, r=4, f=0.55. Thus the rendering time is reduced by almost a factor of 2, given these operational parameters in this embodiment.

Figure 16:
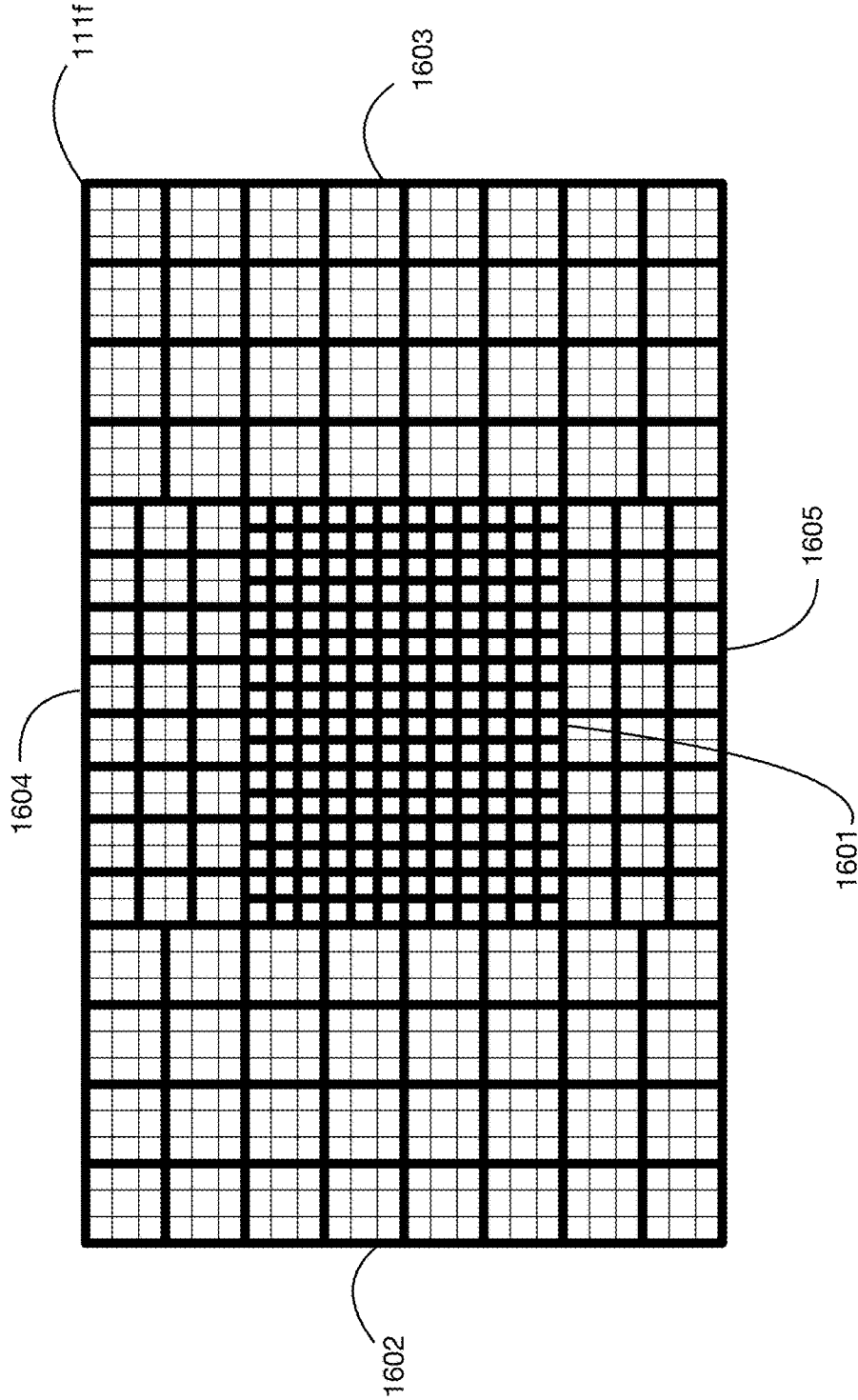
FIG. 16 illustrates another embodiment of a display partitioned into regions with different rendering resolutions.

The regions and grids shown in FIG. 15 are illustrative. One or more embodiments may use any partition of displays into regions, and may group pixels into grid elements of any shape and size. FIG. 16 shows a different illustrative embodiment in which display 111f is partitioned into 5 regions: center region 1601 with 1 pixel per grid element, left and right regions 1602 and 1603 with 9 pixels per grid element each, and top and bottom regions 1604 and 1605, with 4 pixels per grid element each. In one or more embodiments grids and grid elements may not be rectangular. In one or more embodiments the highest resolution display region may not be located in the center of the display. In one or more embodiments the display regions may not be arranged symmetrically. In addition, center region 1601 may refer to the center of the screen or the center of the direction that an eye is pointing for eye tracking embodiments for example.

Figure 17:
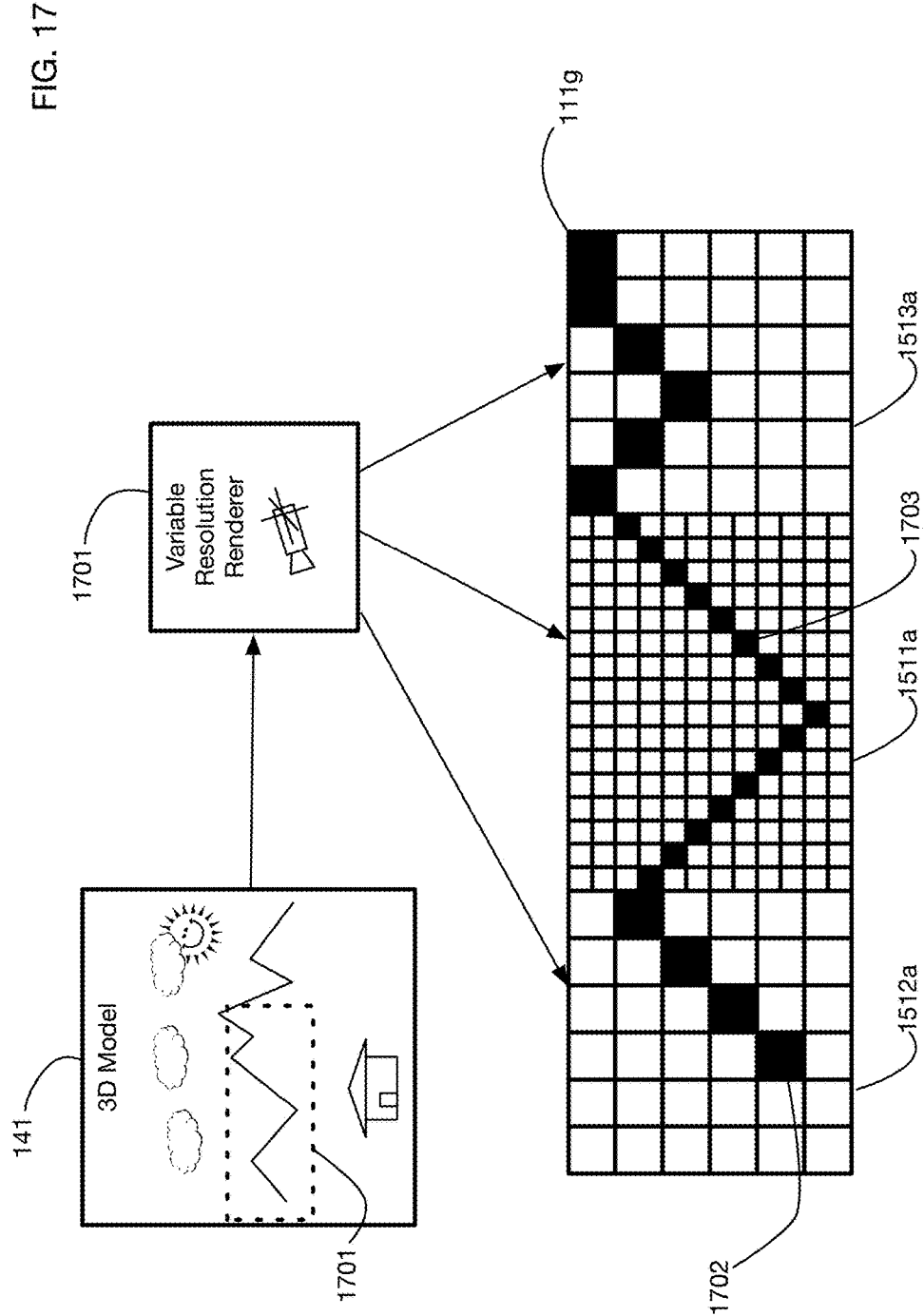
FIG. 17 illustrates the rendering process for an embodiment with variable resolution display regions.

In one or more embodiments a renderer may generate values for the grid elements of the display regions. FIG. 17 illustrates an embodiment that includes 3D model 141, which is to be rendered onto display 111g. The display comprises three regions: high resolution center region 1511a, and low resolution side regions 1512a and 1513a. The renderer 1701 accesses the 3D model 141 and generates grid element values for the display. This renderer is a variable resolution renderer, because the grid elements in different regions of the display have different ratios of pixels per grid element. Area 1701 of 3D model 141 is projected to the display. Because the center region 1511a has, for example, a single pixel per grid element, the objects rendered in the center are rendered with higher resolution than the objects rendered at the sides. For example, rendered grid element 1702 in region 1512a comprises multiple pixels, and is therefore larger (lower resolution) than rendered grid element 1703 in region 1511a, which comprises a single pixel.

Figure 18:
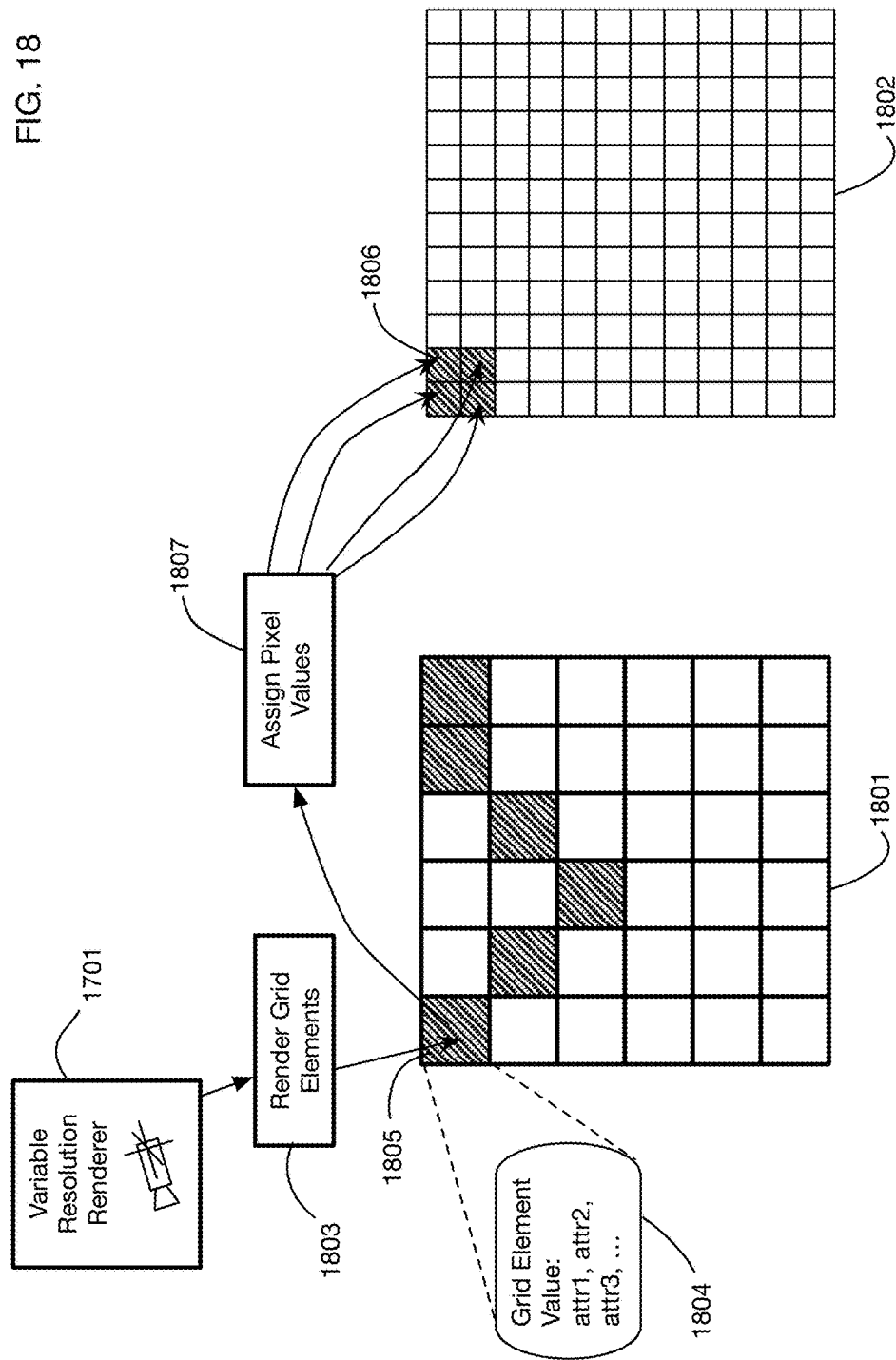
FIG. 18 illustrates an embodiment of the system that renders objects to a grid, which may be coarser than the pixel grid of a display, and then maps grid element values into pixel values.

In embodiments with grid elements that contain multiple pixels, the rendering process eventually sets the value of the individual pixels in the display. In the simplest case, the renderer sets the value of each pixel in a grid element to the rendered value of that grid element. FIG. 18 illustrates an embodiment in which the renderer 1701 renders a model onto grid 1801. (This grid corresponds to a display region. For illustration, each grid element in grid 1801 corresponds to 4 pixels in display region 1802. The rendering process 1803 for grid elements sets the grid element values for each grid element, such as for example value 1804 for grid element 1805. The grid element 1804 is illustrated as a list of attributes; in one or more embodiments grid element values may comprise any desired attributes, such as for example, without limitation, color, hue, saturation, value, intensity, texture, lighting, normal vector direction, material, transparency, or depth. In this example, the values 1804 of grid element 1805 are simply copied directly to the pixels within the grid element, such as pixel 1806. In one or more embodiments the assign pixel values process 1807 may copy or otherwise transform grid element values in any manner to set the values of the pixels within the grid elements. For example, in one or more embodiments the assign pixel values process may set only a subset of the pixels within a grid element to the value of the grid element. In one or more embodiments the assign pixel values process may calculate derived pixel values from the attributes of the grid element using any function, selection, relationship, or transformation.

Figure 19:
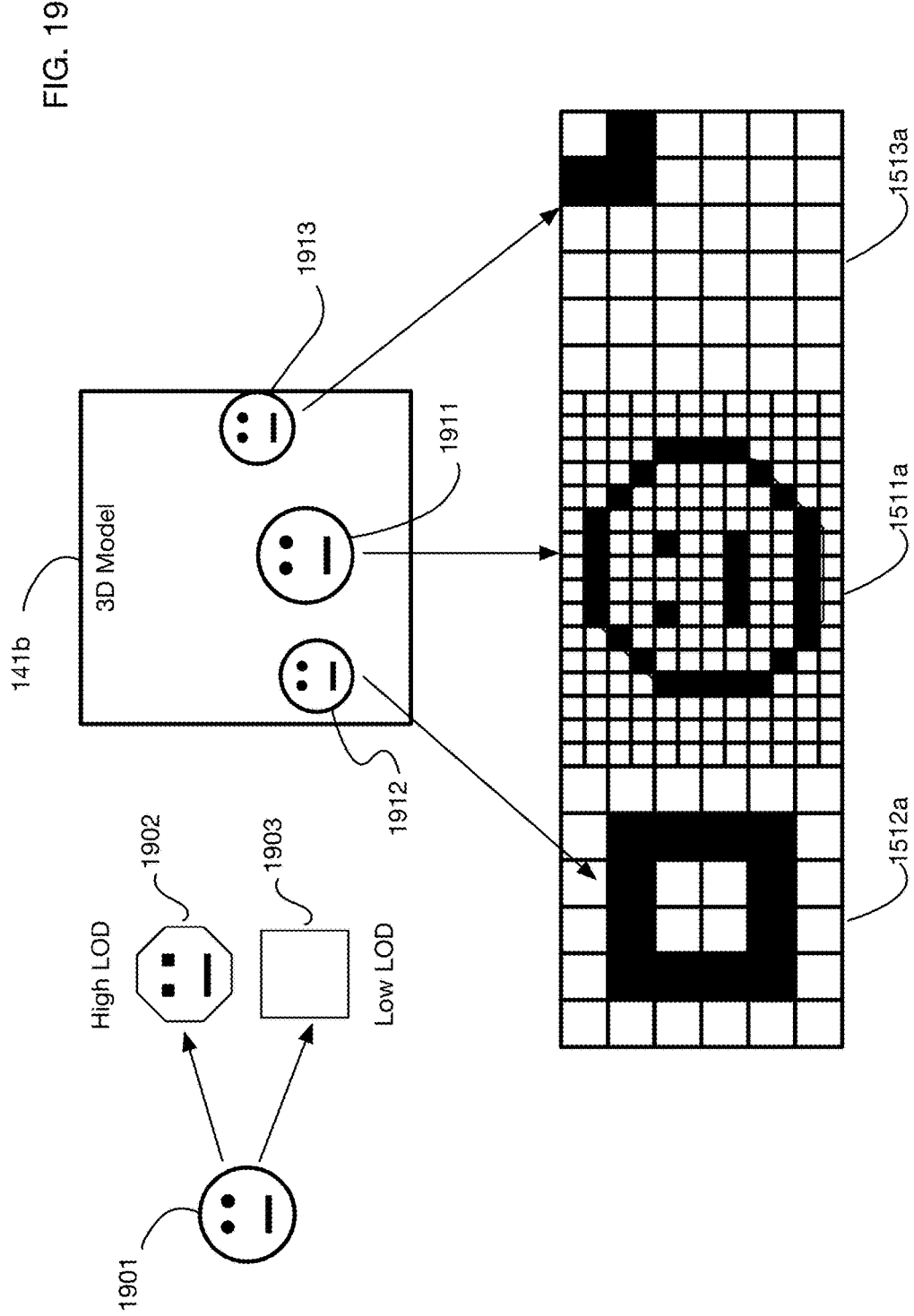
FIG. 19 illustrates an embodiment of the system that renders different objects at different levels of detail, in addition to rendering different display regions at different resolutions.

One or more embodiments may perform additional optimizations to reduce rendering time and complexity, particularly in low resolution display regions. For example, one or more embodiments may include multiple geometry models at different levels of detail for objects in a 3D model. Level of detail techniques are typically used in the art to reduce level of detail for far away objects. One or more embodiments may extend this concept by using lower level of detail models for rendering onto low resolution display regions (with higher ratios of pixels per grid element), regardless of how far away an object is from the viewer. This use of multiple levels of detail for rendering independent of distance is not known in the art. FIG. 19 illustrates an embodiment with an object 1901 that appears in a 3D model. The embodiment obtains or generates two geometry models for the object 1901 at different levels of detail: geometry model 1902 is a high level of detail model, and geometry model 1903 is a low level of detail model. One or more embodiments may use any number of geometry models at different levels of detail for any object or objects in a 3D model. 3D model 141*b* has three copies of this object, for illustration of how different levels of detail are used to render to different display regions. Object copy 1911 is rendered to center display region 1511*a*. Because this region is a relatively high resolution region (with one pixel per grid element), the high level of detail model 1902 is used in this region. Object copy 1912 is rendered to left display region 1512*a*. Because this region is a relatively low resolution region (with 4 pixels per grid element, for example), the low level of detail model 1903 is used in this region. Similarly, object copy 1913 is rendered to right display region 1513*a* using low level of detail geometry model 1903. Rendering a low level of detail geometry model at a lower resolution provides additional savings in rendering time compared to an un-optimized renderer. One or more embodiments may select a level of detail geometry model for rendering based on multiple criteria, including for example a combination of object distance and the resolution of the display region being rendered to.

Figure 20:
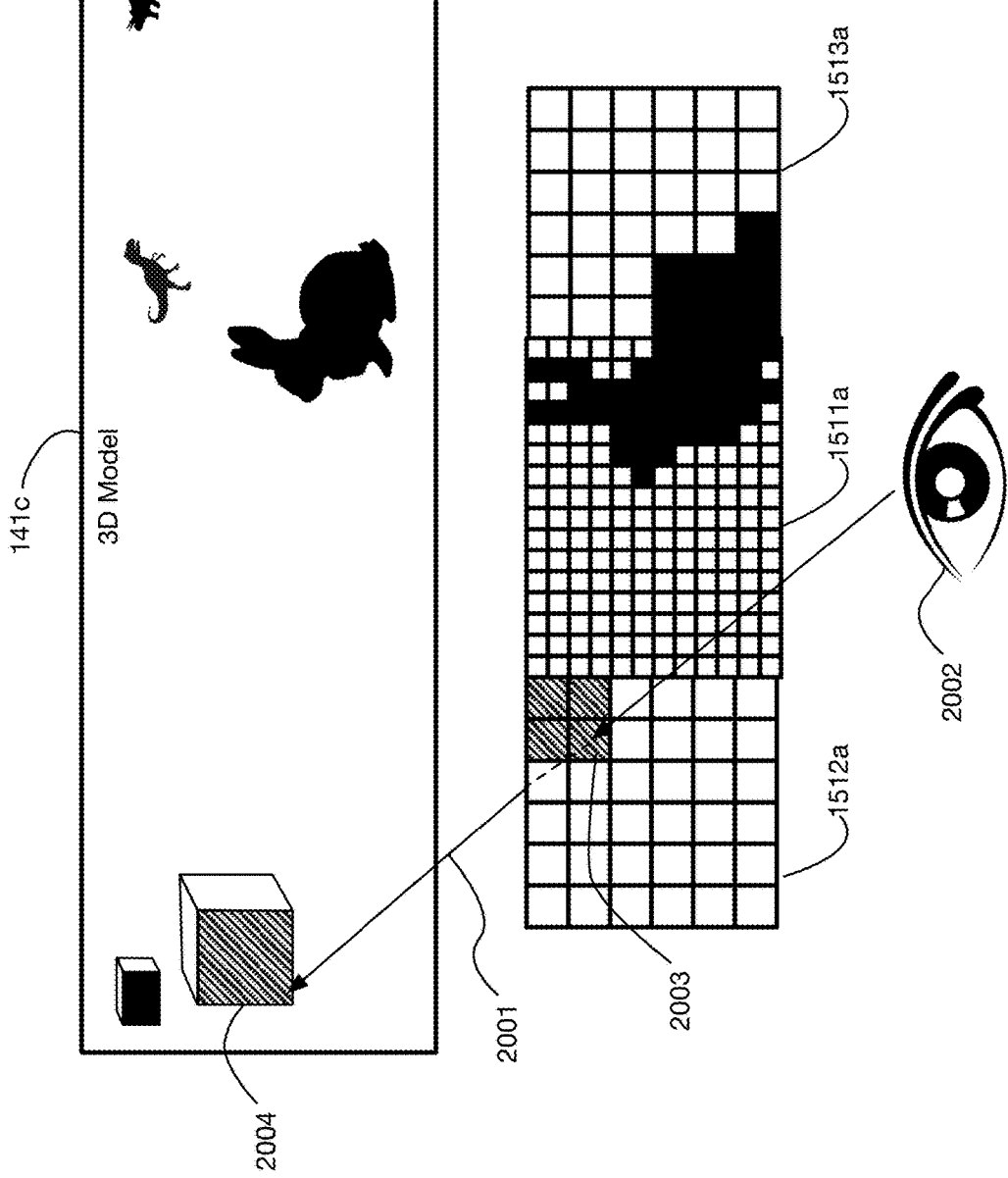
FIG. 20 illustrates an embodiment that uses ray casting to render objects to a grid of grid elements, where a grid element may comprise multiple pixels.

One or more embodiments may use any rendering techniques known in the art to render objects from a 3D model to the grids associated with display regions. FIG. 20 illustrates an embodiment that uses ray casting. As is known in the art, ray casting projects a ray from a viewpoint through each pixel, and uses attributes of the first object intersected by the ray to set the value of the pixel. Ray casting is often viewed as an inefficient rendering technique, because it requires computations for each pixel in a display. Because embodiments of the system may group pixels into grid elements, the number of rays required for ray casting may be significantly reduced. Ray casting may therefore provide an efficient rendering solution for one or more embodiments, particularly for rendering into low resolution display regions. In FIG. 20, ray 2001 is projected from viewpoint 2002 through grid element 2003 into 3D model 141*c*. The nearest object in the 3D model intersected by ray 2001 is object 2004; thus the grid element value is set to reflect the attributes of this object 2004 at the point of intersection. In this illustrative example, a ray is not cast through each pixel, but is instead cast through each grid element (which may contain multiple pixels); this optimization improves rendering efficiency by reducing the number of rays required. In high resolution center display region 1511*a*, grid elements contain (for example) single pixels, so ray casting in this region requires a relatively large number of rays. One or more embodiments may use a mixed rendering technique that for example uses ray casting to render in low resolution display regions but uses other techniques in high resolution display regions. One or more embodiments may use ray casting for all display regions. One or more embodiments may use ray tracing techniques, which consider secondary rays as well as primary rays.

Figure 21:
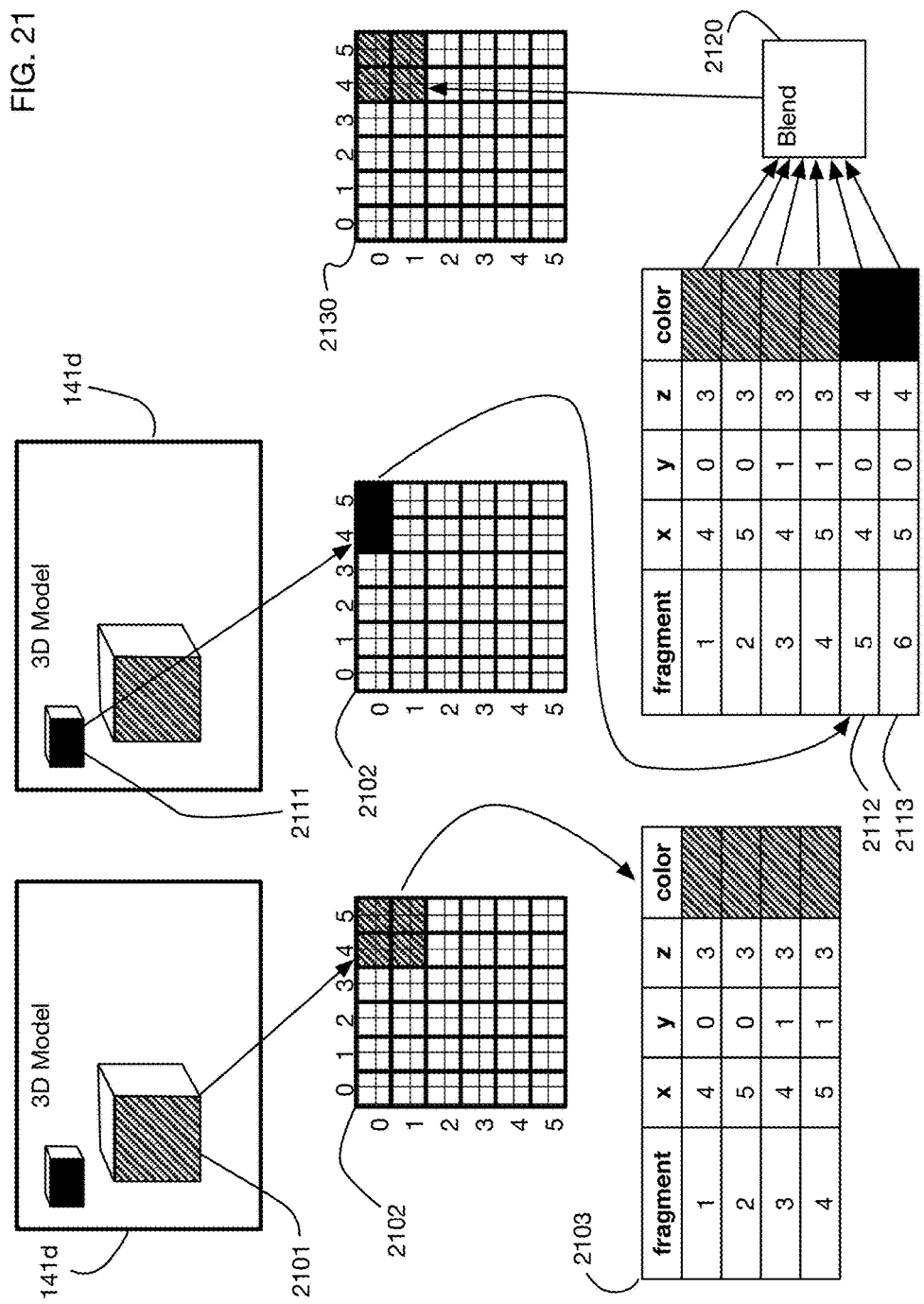
FIG. 21 illustrates an embodiment that uses rasterization to generate grid element fragments from projected geometric primitives associated with objects.

A commonly used alternative to ray casting is rasterization, which effectively reverses the rays and projects from objects in the 3D model onto the display. One or more embodiments may use any of the rasterization rendering techniques known in the art. In addition, one or more embodiments may optimize rasterization techniques by rasterizing objects into grid elements, instead of into pixels as is typically performed in the art. Because there may be fewer grid elements than pixels, rendering efficiency may be improved by rasterizing to grid elements. FIG. 21 illustrates an embodiment of the system that uses grid element rasterization rendering. Geometric primitives (such as triangles for example) from object 2101 in 3D model 141*d* are projected onto an image plane determined by the viewer's location and orientation. This projection yields a set of projected primitives in 2D space, which are then rasterized on a grid of grid elements. For example, the front face of object 2101 is rasterized onto grid 2102, which corresponds for example to a selected region of a display. Rasterization yields a list of grid element fragments 2103. Rasterization as known in the art generally results in a list of pixel fragments; one or more embodiments of the invention use grid element fragments instead of pixel fragments to improve rendering efficiency. In the example of FIG. 21, grid elements of grid 2102 contain 4 pixels each; thus rasterization efficiency may be improved for example by a factor of 4. Fragment table 2103 contains information about each grid element fragment. One or more embodiments may generate any desired grid element fragment information for each fragment. In the example shown, the grid element fragment information includes the x and y grid address of the grid element, the z-depth of the object (used during blending), and the color that should be assigned to the fragment. These values are illustrative; one or more embodiments may use other attributes for fragments as desired. Similarly, geometric primitives from object 2111 are projected onto an image plane and rasterized on grid 2102. This rasterization yields two additional grid element fragments 2112 and 2113. Grid element fragment blending process 2120 then combines the fragments to determine the values 2130 for each grid element. In this example, a simple blending using the z-buffer is used to discard the fragments 2112 and 2113. One or more embodiments may use any desired grid element fragment blending process to determine grid element values from the set of grid element fragments.

Figure 22:
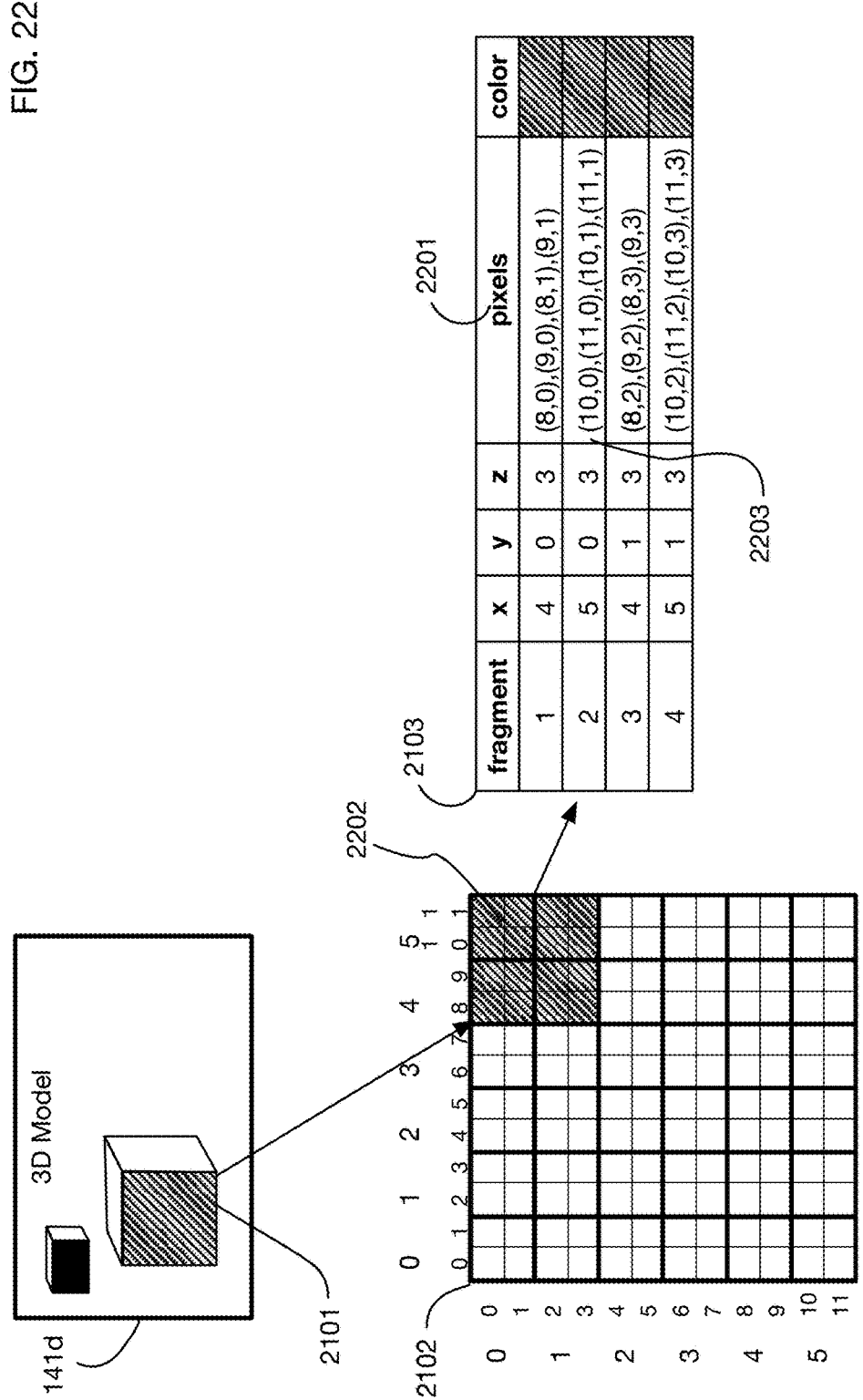
FIG. 22 illustrates an embodiment that incorporates a list of pixel addresses into a grid element fragment.

One or more embodiments may extend the grid element fragment information to include a list of pixels affected by or incorporated into the fragment. FIG. 22 illustrates the rasterization example of FIG. 21 with extended grid element fragment information. As in FIG. 21, the front face of object 2101 is projected to the image plane and rasterized on grid 2102. The resulting fragment table 2103 is expanded to include a list of pixels 2201 associated with each fragment. For example, grid element 2202 at grid address (5,0) includes 4 pixels with pixel addresses (10,0), (11,0), (10,1) and (11,1); these pixel addresses 2203 are associated with fragment #2 in the fragment table 2103. In this example, each grid element fragment lists all of the pixels associated with the grid element. However, one or more embodiments may associate a subset of the grid element pixels with a fragment, which may provide additional rendering flexibility and capability. In particular, one or more embodiments may render selected objects at a sub-grid element level, to increase the resolution of those selected objects.

FIG. 23 illustrates an embodiment of the system that renders selected objects designated as high resolution objects at a pixel-level resolution, even in low resolution display regions with multiple pixels per grid element. 3D model 141e contains two objects: object 2301 is designated as a low resolution object, and object 2302 is designated as a high resolution object. One or more embodiments may classify any number of objects in a 3D model at any level of resolution. One or more embodiments may designate more than two levels of resolution for objects in a 3D model. High resolution objects may for example represent particular objects of interest that a user may focus on; hence it may be desirable to always render these objects at a high resolution, even in low resolution display regions. The renderer may generate grid element fragments that take into account whether a rendered object is a high resolution object or a low resolution object. For example, objects 2301 and 2302 are rasterized on grid 2303. Because object 2301 is a low resolution object, rasterization of this object completely fills each grid element associated with the object, such as grid element 2304. The fragment entry 2305 for this grid element therefore lists all of the pixels contained in the grid element. In contrast, because object 2302 is a high resolution object, rasterization of this object generates fragments that contain individual pixels. For example, fragment 2306 contains single pixel entry 2307, which corresponds to pixel 2308 within the associated grid element. Blending of fragments containing variable number of pixel entries is straightforward, since blending can be done for example on an individual pixel basis.

While the invention herein disclosed has been described by means of specific embodiments and applications thereof, numerous modifications and variations could be made thereto by those skilled in the art without departing from the scope of the invention set forth in the claims.

What is claimed is:

1. A variable resolution virtual reality display system comprising:
   at least one display viewable by a user and partitioned into at least two display regions having different resolutions;
   a pose analyzer that calculates a pose of one or more body parts of said user;
   a scene renderer coupled to said at least one display and to said pose analyzer, wherein said scene renderer
      receives said pose from said pose analyzer; and,
      based on said pose, calculates a rendered image for each of said at least two display regions; and,
   an image warper coupled to said at least one display, said scene renderer, and said pose analyzer, wherein said image warper
      receives said pose from said pose analyzer;
      calculates a change in pose from said pose; and,
      when said change in pose is below a threshold value,
         generates a rerendering approximation of said rendered image for each of said at least two display regions based on said change in pose; and,
         modifies one or more pixels of said at least one display based on said rerendering approximation.

2. The system of claim 1, wherein
   said at least two display regions comprise
      a high resolution center region located in a center of a field of view of said user;
      a low resolution left region located in a left portion of said field of view; and,
      a low resolution right region located in a right portion of said field of view.

3. The system of claim 1, further comprising a 3D model of a scene, wherein
   at least one object in said 3D model comprises at least two geometry models at different levels of detail;
   for each display region of said at least two display regions, said scene renderer
      selects a level of detail for said at least one object; and,
      calculates said rendered image using a geometry model for said level of detail associated with said at least one object.

4. The system of claim 1, further comprising
   at least one sensor that generates sensor data that measures one or more aspects of said pose of said one or more body parts of said user; and,
   wherein said pose analyzer calculates said pose of said one or more body parts of said user based on said sensor data generated by said at least one sensor.

5. The system of claim 1, wherein said rerendering approximation comprises
   calculating a pixel translation vector; and,
   translating one or more pixels of said rendered image for each of said at least two display regions by said pixel translation vector.

6. The system of claim 5, wherein calculating said pixel translation vector comprises
   approximating said change in pose as a rotation around a unit vector $\hat{\omega}$ comprising $\hat{\omega}_y$ and $\hat{\omega}_x$ by an angle $\Delta\theta$;
   calculating a spatial translation vector $(\hat{\omega}_y \Delta\theta, -\hat{\omega}_x \Delta\theta)$;

calculating a scaling factor to convert spatial distances to pixels based on pixel dimensions and fields of view of said rendered image for each of said at least two display regions; and, calculating said pixel translation vector by scaling said spatial translation vector by said scaling factor.

* * * * *